(12) United States Patent
Asanovic

(10) Patent No.: US 12,346,268 B2
(45) Date of Patent: Jul. 1, 2025

(54) ADDRESS RANGE ENCODING IN SYSTEM ON A CHIP WITH SECURELY PARTITIONED MEMORY SPACE

(71) Applicant: SiFive, Inc., San Mateo, CA (US)

(72) Inventor: Krste Asanovic, Oakland, CA (US)

(73) Assignee: SiFive, Inc., Santa Clara, CA (US)

( * ) Notice: Subject to any disclaimer, the term of this patent is extended or adjusted under 35 U.S.C. 154(b) by 316 days.

(21) Appl. No.: 18/115,457

(22) Filed: Feb. 28, 2023

(65) Prior Publication Data

US 2024/0289495 A1   Aug. 29, 2024

(51) Int. Cl.
*G06F 12/14* (2006.01)
*G06F 21/72* (2013.01)

(52) U.S. Cl.
CPC .......... *G06F 12/1458* (2013.01); *G06F 21/72* (2013.01)

(58) Field of Classification Search
CPC .............................. G06F 12/1458; G06F 21/72
See application file for complete search history.

(56) References Cited

U.S. PATENT DOCUMENTS

2012/0215989 A1* 8/2012 Moyer ................ G06F 12/1416
711/E12.091

* cited by examiner

*Primary Examiner* — Aracelis Ruiz

(74) *Attorney, Agent, or Firm* — Kilpatrick Townsend & Stockton LLP

(57) ABSTRACT

Systems and methods are disclosed for address range encoding in a system on a chip with a securely partitioned memory space. For example, methods may include receiving, via a bus from a processor core, a memory request for a memory mapped resource; comparing an address included in the memory request to an address range, determined based on an address field and an address range configuration field, for a resource; comparing a first hardware security identifier from the memory request to a hardware security list associated with the resource when the address of the memory request is within the address range for the resource; and, based on the comparison of the first hardware security identifier with the hardware security list, determining whether to allow or reject access to the resource for the memory request.

20 Claims, 8 Drawing Sheets

ADDRESS RANGE ENCODING IN SYSTEM ON A CHIP WITH SECURELY PARTITIONED MEMORY SPACE

TECHNICAL FIELD

This disclosure relates to address range encoding in a system on a chip with a securely partitioned memory space.

BACKGROUND

Software isolation is an important feature mandated by distinct concerns. Considering the trend of increasing code size, the different origins of the code and the ways they are combined, important risks exist that one part can impact another one, intentionally or not.

If there is a bug and the disturbance is not on purpose, there is a concern about safety: a health-oriented device (e.g., a medical device, a car brake, a nuclear plant sensor) shall maintain its capacity for its main mission, even another piece of software running on the device has bugs and goes into infinite loop or erratic behavior.

If there is a weakness and the disturbance is on purpose, there is a concern about security: a credential-oriented device (payment terminal, badge control system, DRM-equipped device) shall resist or raise a flag, and not compromise any asset it protects. It is advantageous to develop solutions that guarantee that the failure of one piece of software does not impact the correct and full functioning of other pieces, running on the same platform.

Beyond that, it is advantageous to guarantee that an aggressive or uncontrolled piece of software cannot impact a resource belonging to another piece of software running on the same platform. Impacting any resource can have a broad meaning, from simply reading a portion of memory to modifying this portion of memory or preventing from using a peripheral. Security requirements may be more demanding than safety requirements as the latter usually lead to solutions where the application code is able to change its own privilege mode while the former usually requires that the application code cannot change its privilege mode. Thus, safety schemes, usually based on regular real-time OS, often cannot comply with security requirements while the opposite is true.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
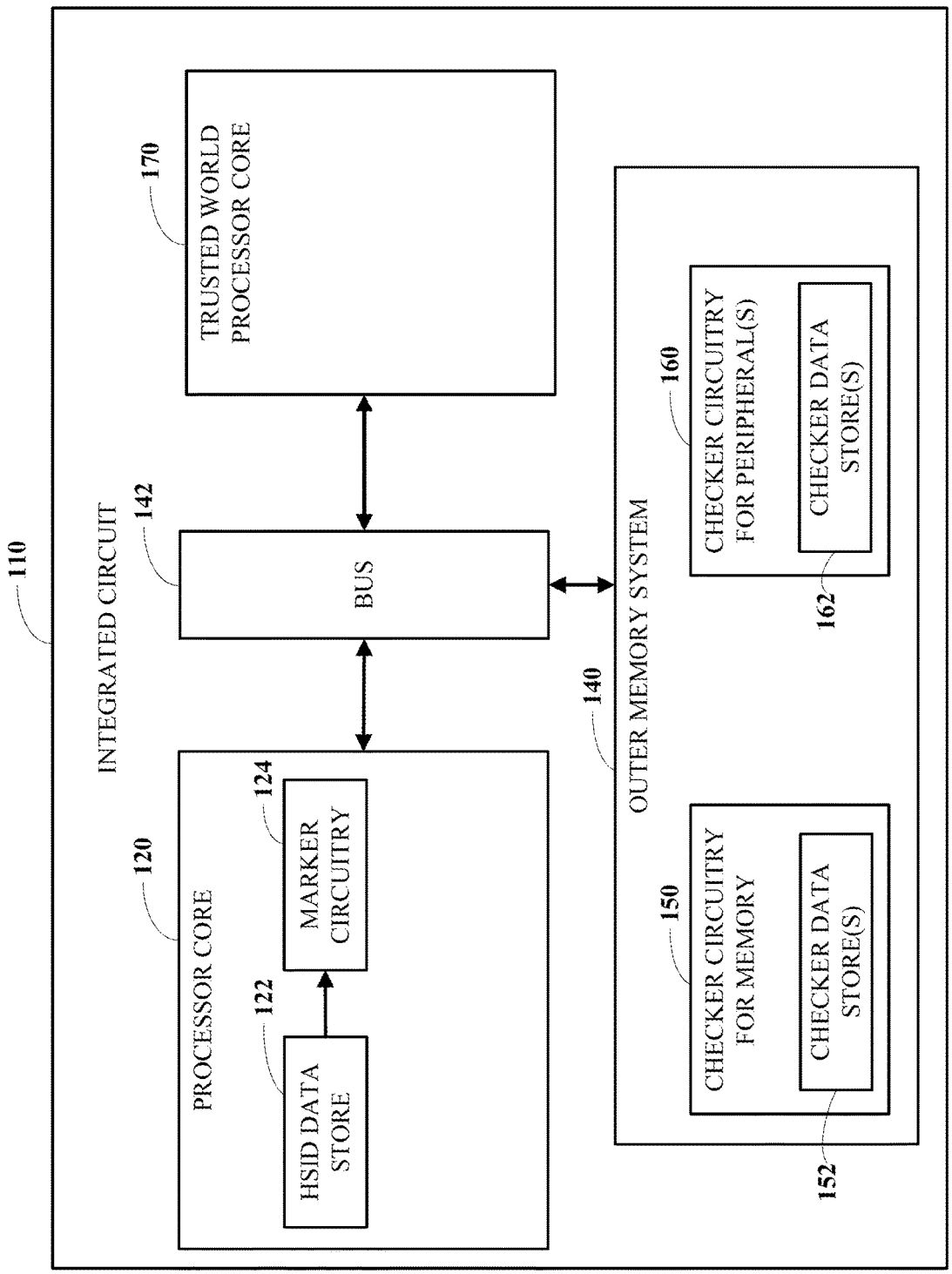
FIG. 1 is a block diagram of an example of an integrated circuit for address range encoding in a system on a chip with a securely partitioned memory space.

A hardware-enforced multi-domain solution, such as SiFive WorldGuard, provides protection against illegal accesses to memories/peripherals from software applications and/or other masters. This solution aims to provide hardware means that guarantee strict and strong isolation between distinct software applications running on the same platform (e.g., single or multi-core) accessing shared resources (e.g., memories or peripherals) (see, e.g., "SiFive WorldGuard High-Level Specification"). Some implementations described herein implement access control for memory mapped resources in an integrated circuit using checker circuitry that encodes address ranges associated with respective resources using multiple formats that are selectable using an address range configuration field, including as a base address with a size or an upper bound and a lower bound. In a data structure with entries for multiple entries for respective resources, a lower bound address may be determined based on an upper bound of an address range for an adjacent entry, which may reduce the storage requirements and associated power consumption per resource for a checker circuitry controlling access to multiple memory mapped resources. In some implementations, a lower bound for an address range is determined based on a highest address in an address range for an adjacent entry that encodes its address range as a base address and a size.

A hardware-enforced multi-domain solution is applicable to a wide variety of processors and software architectures. This solution proposes to create "worlds" that gather applications running on cores and other masters' resources like DMA channels and subordinate resources like memories or peripherals. The possible number of worlds is hardware configurable, depending on the number of cores and masters, on memories' configurations, and on the software architecture. This solution does not replace the physical memory protection (PMP) mechanism (applicable to one single core for the memories) but extends it to a multi-core, multi-software system with other masters.

The principle is to gather masters, memory areas and peripherals within sets of resources, named worlds. The worlds are distinct from each other, which means the software running on cores belonging to a world 1 cannot access resources (e.g., memory portions and peripherals) belonging to a world 2 and more generally cannot interfere with the other worlds. Of course, for inter-world communications, some memory portions can belong to more than one world, behaving as shared memory. So, one unique world identifier value is assigned to a world, and within this world, each of the masters belonging to the world is assigned the same world identifier value. This allocation is usually done for each master, the granularity level being the whole master. But a finer granularity can even be provided if the master design can support it. That is the case for cores, named WorldGuard-aware cores. On these cores, the world distinction can now also depend on the privileged mode, having distinct world identifiers based on the privilege mode (e.g., M-mode, S-mode, U-mode) on the same core. (See, e.g., "RISC-V Privileged Specification").

In some implementations, debug is selectively enabled for these worlds using a debug world list. For example, when a world identifier (WID) cannot be debugged, the debug interrupt and exceptions are not taken. In some implementations, when a debug interrupt is taken on a specific hart/core, the core jumps to an address (e.g., 0x800) in the debug ROM, in debug mode. At this stage, after some initialization, the debug ROM code can execute Abstract-Commands. The check mechanism is based on the use of the desr.prv, either directly (for the CSR access) or indirectly (for the data access). So, the debug ROM code: (for CSRs) performs regular access to the CSR addresses against dcsr.prv and allows access only to that privilege, except for authorized CSRs; and (for memory) performs regular addresses requests with the core WID value based on the dcsr.prv register (instead of mstatus.prv). Therefore, accesses are granted if and only if the WID world has access to the requested address.

Note: as the RISC-V debug specification allows that "A debugger can change this value to change the hart's privilege level when exiting Debug Mode", the debugger may not be able to change the desr.prv. As for the secure authenticated debug scheme, this WorldGuard-enforced debug process may rely on firmware execution. Therefore, the robustness of this code, especially the portions where the authorization is checked, should be addressed if fault attacks are considered.

For example, a first technique is to consider that the debug is authorized if and only if there is a debug interrupt/exception and the current WID value authorizes the debug, based on the current WID value and the debug-wid-list list.

A second technique is to focus on the way the debug ROM code accesses to access-controlled resources, the CSRs and the resources; while the debug ROM code (the one executed during debugging operations) runs in debug mode (e.g., the highest privileged mode), it does not use these privileges for the accesses and uses the privileged mode and WID value used by the debugged software. For example, the access control may be granted with the dcsr.prv and not the mstatus.prv, which means the access control is performed based on the rules applicable for the debugged software privilege mode and WID value, not the rules of the debugging software. This second technique may simplify a lot the check of the accesses as it reuses the WorldGuard mechanisms and principles. So, the debug ROM code may be small and the approach may be consistent with the other World-Guard mechanisms.

For example, WorldGuard is a software isolation hardware-based solution for processor cores. It applies to physical addresses. In the rest of the document, wg might be used to denote WorldGuard.

WorldGuard is a hardware-enforced multi-domain solution that provides protection against illegal memories/peripherals accesses from software applications and/or other masters, like DMAs. It aims to provide hardware means that guarantee strict and strong isolation between distinct software applications running on the same platform (single or multi-core) accessing shared resources (memories, peripherals).

For example, the circuitry and techniques described herein may be applicable to variety of processors for many different software architectures. For example, they can be implemented using the RISC-V instruction set architecture.

Some implementations create "worlds" that gather applications running on cores and other masters like DMA channels and resources like memories or peripherals. A world defines permissions on physical addresses in the system, can overlap, and does not affect software-visible cache coherence. Software isolation is achieved by restricting a world's access to specific physical addresses that would be bound to different components in a system. A world in a WorldGuard-enabled system or chip will be identified by a world identifier or WID.

The possible number of worlds is hardware-configurable at elaboration stage and should be determined by the number of cores and masters, the memories' configurations, and mostly the software architecture.

Mechanisms and Blocks

On the master side, wgMarkers are used to "mark" the request out of the master. The marking is based on the world the master belongs to, being a numeric value, named world identifier, unique per world. This marked request is sent to the resources/slaves blocks (memories, peripherals).

On resources/slaves, wgCheckers are positioned "in front of" the resources for checking the marked requests.

The wgCheckers contain configurations that define rules of access. For example, a rule for a memory defines a portion of this memory and the list of the worlds that can access this portion, and in which way (read or read-write). So, the verification of a marked request coming from a master is performed by comparing the couple request address-world identifier to the rules present in the wgChecker configuration.

The wgCheckers may also contain error registers and interrupt bit fields.

In some implementations, if the first rule that matches the address also matches the world identifier and the access way, the check is granted and the wgChecker authorizes the request to be satisfied in the resource. If the check fails, there is an error.

The way to configure the wgMarkers and the wgCheckers may require some privileges. In some implementations, wgMarkers not associated to a core (e.g., a DMA) and wgCheckers' configurations can only be changed by a trusted world. wgMarkers associated with a core can be set by local-to-the core privileges (e.g., machine mode, . . . ).

Error Management

When a marked request reaches a wgChecker, the wgChecker compares the marked requests with the wgChecker rules. If this request does not match with any of the rules, it can trigger two different events (this is optional and configurable for each wgChecker): The main event is to source an interrupt signal. This interrupt signal can be a source for the interrupt controller. In that case, an interrupt handler can be run in case a violation occurs. Any core can theoretically register to receive this interrupt signal. It may be preferred to have the core running for the trusted world to register to receive this interrupt signal, as this core may be dedicated to security monitoring.

As a second event, a denied message is sent back to the master source of the error. This denied message may be converted to an interrupt signal, in presence of a Bus Error Unit (BEU). The BEU is a per-processor device that records erroneous events and reports them using the PLIC (if available) or via hart-local interrupts. The BEU can be configured to generate interrupts on ECC errors if ECC is included in the design, or TileLink bus errors. In some implementations, when an error occurs, the BEU will hold the address of the error and a code to describe the error. The denied message may also trigger a core exception.

The two events above lead to the following strategy. First, a global, platform-level interrupt signal is caught by the interrupt handler in the trusted firmware, in charge of the security monitoring. This firmware may be able to receive and manage violations wherever they come from (this is its duty to do so). Second, a local, core-level interrupt signal is caught by the interrupt handler in the firmware running on the core that causes the violation. If the violation comes from a bug, the source core can be able to locally manage the problem and to, maybe, correct the issue. For single-core platforms, the trusted core and the local core may be the same core.

If the violation comes from an attack, the source core may be controlled by the attacker and so cannot be trusted for any forensic effort. Therefore, this is the trusted firmware interrupt handler, thanks to the global interrupt, that can also manage and investigate the problem.

For a deeper investigation, some information about the violation is available from the wgChecker errors registers (a wgChecker may have its own error registers): (1) the address contained in the request, (2) the world identifier associated to the request, and (3) the access mode (e.g., read, write, or execute). Note, in some implementations, this information is only accessible by the trusted world firmware.

Acknowledgment

Often a first violation will be followed by many others of the same kind. Nevertheless, it is often important to analyze the first violation as it may be the most important and the one that can give the best clues as to what went wrong. So, the error registers also include a bit field named ACK, which prevents the error registers from being updated following a new violation. It is only when the ACK bit field is set, i.e., the information above is considered as acknowledged, that the error registers can be updated with the most recent violation information.

Access Rules

Error information about a violation can be very valuable for an attacker, especially when the attack scenario is not precise (e.g., a fault attack). In some implementations, the access to the error information shall be restricted to the highest privilege world, the trusted world. This means that the world that has caused the violation cannot directly access the error registers.

So, the trusted interrupt handler can access this information and the local source-core interrupt handler cannot directly. If the latter wants these details, it shall ask the trusted interrupt handler to share this information. This is then up to the trusted firmware to determine if the source core firmware can be trusted and then the information can be shared.

Examples of Non-ISA WorldGuard Hardware Platform Components

The overall structure of a hardware platform supporting WorldGuard is platform-specific. A hardware platform may include markers that add WIDs to hardware-agent accesses and checkers that check access permissions at some location in the path to resources. All accesses targeting a WG-protected resource must be associated with a WID.

The design of WG markers and checkers may be customized for particular device agents and resources respectively. One of the motivations for WG is to reduce the cost of securing platform-level accesses by customizing WID checks at the resources instead of requiring that all information is handled in a generic form at the agents.

The configuration of the WG markers and WG checkers can be fixed at design time or be controlled by writable state. Where markers and checkers have dynamic configuration state, it is recommended that the state is reset to a known platform-specific configuration or to a safe state that prevents unauthorized accesses. Dynamic configuration state is typically initialized by trusted boot-time software. A mechanism should be provided to lock this state after initialization until the next reset. Typically, assignment of agents and resources to worlds is performed once at boot time and locking the configurations provides additional security.

Example of Generic WG Checker

Although WG checkers can be customized for individual resource types on a platform, a generic interface to a checker is provided here, based on the RISC-V PMP model. This design can be used directly for applications requiring flexible world configuration over a large resource address range and can also be used as a basis for more customized checker designs.

The generic checker monitors a fixed physical address range and allows for software configuration of permissions within that address range. A number of programmable slots are provided within the checker. Each slot can specify a rule for a contiguous subset of addresses within the checker's overall memory address range, giving the read and write permissions for each world for that address subset.

This section describes the software interface to such a checker. Full implementation specifications may include many further platform-specific details on bus interfaces, reset, clocking, and power management, for example.

Example of a Configuration Register Memory Map

The configuration registers for the generic checker are memory-mapped into a separate region of physical memory addresses, which is usually protected such that only trusted software can alter the configuration at boot time.

The memory-mapped interface may be designed to be operated using only individual 32b accesses.

TABLE 1

WG Generic Checker Configuration Register:

| Offset | Bytes | Access | Name | Description |
|---|---|---|---|---|
| 0x00 | 4 | R | Vendor | Vendor ID |
| 0x04 | 4 | R | Impid | Implementation revision |
| 0x08 | 4 | R | Nslots | Number of rule slots |
| 0x0C | 4 | | | Reserved |
| 0x10 | 8 | RW | Errcause | Information about a permissions violation |
| 0x18 | 8 | RW | Erraddr | Address of a permissions violation |
| 0x20 | (nslots + 1) * 32 | RW | slot[nslots:0] | Array of slots |

The read-only vendor and impid registers provide details on the vendor and implementation version of the checker.

The read-only nslots parameter is encoded as a 4-byte unsigned integer which gives the number of variable rule slots available in this checker. The value of nslots must be ≥1. The read-only slot[0] is not counted in the nslots value.

The errcause and erraddr registers are used to report permissions violations, as described below.

Example of Rule Slot Format

In this example, each slot defines one rule and occupies 32 bytes of address space formatted as follows:

TABLE 2

WG Generic Checker Slot Configuration (32 bytes total per slot):

| Offset | Bytes | Name | Description |
|---|---|---|---|
| 0x00 | 4 | addr[33:2] | Rule address |
| 0x04 | 4 | addr[65:34] | Rule address (RV64 systems only, zero on RV32) |
| 0x08 | 8 | perm[nWorlds-1:0] | R and W permissions for up to 32 worlds |
| 0x10 | 4 | cfg | Rule configuration |
| 0x14 | 12 | | Reserved |

The addr[65:2] register holds a single physical address for the rule, shifted right by two bits to allow the first 32b register to represent the 34-bit physical address range of an Sv32 system. Address registers may be constrained (WARL) to only hold addresses naturally aligned to a certain protection granule, e.g., 4 KiB.

The perm register holds two bits per WID that give the WID's read and write permissions for the rule. Bit $2*i$ holds the read permission for WID i, and bit $2*i+1$ holds the write permission for WID i.

The cfg register specifies the behavior of the rule, and is formatted into fields as follows:

TABLE 3

WG Rule Configuration Register:

| Bits | Name | Description |
|---|---|---|
| 1:0 | A[1:0] | Address range configuration |
| 7:2 | | Reserved (write zero) |
| 8 | ER | Report read violations as bus errors |
| 9 | EW | Report write violations as bus errors |
| 10 | IR | Report read violations as interrupts |
| 11 | IW | Report write violations as interrupts |
| 30:12 | | Reserved (write zero) |
| 31 | L | Lock bit |

The A[1:0] field specifies how the address range of the rule is constructed, according to the following table:

TABLE 4

WG A[1:0] encoding:

| A[1:0] | Name | Description |
|---|---|---|
| 0 | OFF | Rule disabled (grants no access permissions) |
| 1 | TOR | Top of range |
| 2 | NA4 | Naturally aligned four-byte region (optional) |
| 3 | NAPOT | Naturally aligned power-of-two region ≥8 bytes (optional) |

When A=OFF, the rule will grant no access permissions.

When A=TOR, the rule's addr register specifies the top of the rule's address range and the preceding slot's addr register gives the bottom of the rule's address range, when the preceding slot's cfg field is set to OFF or TOR. A TOR rule matches an address y where:

$$\text{slot}[i-1].addr <= y < \text{slot}[i].addr \text{ \# slot}[i-1].cfg = \text{OFF or TOR}$$

The A=NA4 and A=NAPOT encodings are optional. If provided, they may be based on the format of the RISC-V PMP encoding, and allow a single addr register to encode a base address and the size of a naturally aligned power-of-2 (NAPOT) region.

The figure below shows how the NAPOT range encoding differs from RISC-V PMPs. The checker typically monitors a fixed NAPOT subset of the entire physical address range. The address bits marked with a b represent the non-writeable bits in addr, which hold the base address of the checker region. The writable address bits in the addr registers are marked as a.

TABLE 5

WG NAPOT range encoding for a checker covering a NAPOT total address range:

| addr[65:2] | A[1:0] | Match type and size |
|---|---|---|
| bb . . . bb000 . . . 0000 | | Address of first byte in checker range (slot[0].addr) |
| bb . . . bbaaa . . . aaaa | NA4 | 4-byte NAPOT range |
| bb . . . bbaaa . . . aaa0 | NAPOT | 8-byte NAPOT range |
| bb . . . bbaaa . . . aa01 | NAPOT | 16-byte NAPOT range |
| bb . . . bbaaa . . . a011 | NAPOT | 32-byte NAPOT range |
| . . . | . . . | . . . |
| bb . . . bba01 . . . 1111 | NAPOT | half of checker range |
| bb . . . bb011 . . . 1111 | NAPOT | all of checker range |
| bb . . . bb111 . . . 1111 | NAPOT | all of checker range |
| bb . . . bb111 . . . 1111 | | Address of last four-byte word in checker range (slot[nslots].addr-4) |

For the A=NA4 configuration, the addr value (composed of fixed b bits and variable a bits) holds the base address of the four-byte NAPOT range.

For the A=NAPOT configuration, a run of contiguous 1 bits in the least-significant addr bits sets the size of the slot's NAPOT region, with the least-significant 0 bit representing the most-significant bit that is not part of the slot's base address (e.g., addr[3] is zero for a 16-byte NAPOT region). The addr bits above the least-significant zero bit (both fixed b bits and variable a bits) set the base address of the slot's NAPOT region. When the highest writable a bit is set to 0, the slot's NAPOT range covers the entire address range monitored by the checker. When all the writable a bits are set to 1, the range is also the entire checker's address range, i.e., the setting of the highest a bit is a "don't-care" under a NAPOT encoding when all lower bits are set to 1. The NAPOT thermometer encoding of the masked address bits may be designed to simplify the logic needed to perform the NAPOT address comparison.

In another departure from the RISC-V PMP encoding, when a NAPOT slot is being used as the base address for a TOR configuration in the next-highest numbered slot, the address used in the comparison is one greater than the highest byte address in the NAPOT slot's region, i.e., a TOR rule matches an address y where:

$$\text{slot}[i-1].addr <= y < \text{slot}[i].addr \ \# \ \text{slot}[i-1].cfg = \text{OFF or } TOR$$

$$\text{slot}[i-1].\text{napot\_top} <= y < \text{slot}[i].addr \ \# \ \text{slot}[i-1].cfg = NA4 \text{ or } NAPOT$$

where napot_top is one greater than address of the highest-addressed byte in slot[i−1]'s NAPOT range. Compared to the standardized RISC-V PMP encoding, this optimization reduces by one the number of slots needed to represent a variable-sized region following a NAPOT region in the address map. In some implementations, no significant additional comparator logic is required over a standard PMP design.

The IR and IW bits indicate whether an interrupt should be generated if an access fails global permissions checks but falls within the address range of the rule. The IR bit specifies the response to read transactions, while the IW bit specifies the response to write transactions. If the IR or IW bit is clear, then no interrupts are reported. If the IR or IW bits are set, then interrupts are reported for permission violations for this rule.

The ER and EW bits indicates whether bus-error responses should be returned for bus transactions that fail global permissions checks but fall within the address range of rule. The ER bit specifies the response to read transactions, while the EW bit specifies the response to write transactions. If the ER is set, reads return zero data but also an error response, and if the EW bit is set, writes are ignored but return an error response. The type and encoding of the error responses is bus protocol-specific. If the ER bit is clear, reads return zero data but the transaction response does not indicate an error. If the EW bit is clear, writes are ignored, and the transaction response does not indicate an error. The IR, IW, ER, and EW bits may be used to tailor the checker's behavior for memory regions that are cacheable, idempotent, or non-idempotent.

The L bit indicates that this entry is locked. Once this is set, the slot data cannot be modified or unlocked without a reset of the checker. Note that when two slots are used to specify a range, both slots must be individually locked to prevent a change in the range.

The other bits in the cfg register may be reserved for future use and may be written as zeros.

Examples of Address Range Bounds

The first slot, slot[0], may be a special rule slot that follows the same format as other slots but where the addr field is set to the address of the first byte of the checker's address range and where cfg.A[1:0] is hard-wired to OFF. Slot[0] never provides permissions for an access (perms[ ] are all zero) and the addr field is only used to delimit the start of the checker's address range. The IR, IW, ER, EW and L bits are implemented in the slot[0].cfg register but are used to determine the interrupt and error response to transactions that do not overlap with any other rule's address range, with the L bit locking this configuration until the next reset.

The last slot slot[nslots] has a read-only addr field that holds the address of the first byte past the end of the checker's address range. The last slot's cfg field can only be set to OFF or TOR. Otherwise, the last slot can be configured as with the other writeable slots in the checker. The smallest possible generic checker with nslots=1 has only this one writable rule slot[1] together with slot[0], and when set to cfg=TOR this controls world permissions for the entire checker address range.

When an attempt is made to write an addr register with a physical address y outside the range of the checker (i.e., y<slot[0].addr OR y>=slot[nslots].addr), the corresponding addr field may be set to the bottom of the checker's range (i.e., slot[0].addr). Storing only addresses within the range of the checker reduces hardware requirements. In normal usage, the checker would be placed in the platform's bus fabric such that only accesses within the range would be presented to the checker. In some implementations, there is no error reporting if an invalid configuration is written. The software setting up the configuration should read back the values to check they were set correctly if this is a concern.

Example of Error-Reporting Registers

The checker has two error-reporting registers errcause and erraddr that are written when an access violation is reported. The erraddr register holds the failing physical address shifted right by 2 bits (addr [65:2]) to allow the lower 32b register to hold the full 34b physical address space in an RV32 system.

The errcause register is formatted as shown in the Table below.

TABLE 6

WG Error cause register errcause format:

| Bits | Name | Description |
| --- | --- | --- |
| 7:0 | wid | The WID that cause the error |
| 8 | r | If set, a read caused the error |
| 9 | w | If set, a write cause the error |
| 31:10 | | Reserved (write zero) |
| 61:32 | | Reserved (write zero) |
| 62 | be | Bus error generated |
| 63 | ip | Interrupt generated |

The wid, r, and w fields record the WID and access type of the transaction that caused the error.

The be bit is set if the violation caused a bus error to be reported, cleared otherwise.

The ip bit is set when the violation raises an interrupt.

Note The ip bit provides a level-sensitive interrupt signal that can be fed to a platform-specific interrupt controller.

Both be and ip bits can be set by the same violation as detailed below.

With either of the be or ip bits is set, further violations do not update the errcause or erraddr registers.

The be and ip bits must be cleared by software to reenable further error reports and new interrupts.

Usually, a software handler will read errcause and erraddr fields before clearing errcause. Generation of bus-error responses may be independent of the errcause value, so bus-error responses will continue to be generated. But new interrupts cannot be generated until the be and ip fields are cleared.

Examples of Operation of the Checker

When an access arrives at the checker, each rule is independently evaluated to determine if the access is within the rule's address range and if so, whether the rule grants the WID the necessary read or write permissions.

The transaction will proceed normally if any rule permits access. Rules may overlap in address ranges, but permissions are strictly accretive.

If no rule grants access, the access is prevented. Where the following descriptions say the violation is recorded in the error registers, the update to the errcause and erraddr registers only occurs if there is no existing error recorded in the registers (i.e., errcause.ip and errcause.be are both zero).

When a transaction is prevented, if any rule with an address range including any byte of the transaction has the IR or IW bit set for reads and writes respectively, or if no rules overlap the transaction but the slot[0].cfg.IR or slot[0].cfg.IW bit is set for reads and writes respectively, the failed access attempt will be recorded in the error registers in the checker and will generate an interrupt from the checker.

When a transaction is prevented, but no rule has an address range that includes any byte of the transaction with the IR or IW bit set for reads and writes respectively, or if no rules overlap the transaction and slot[0].cfg.IR or slot[0].cfg.IW are clear for reads and writes respectively, no interrupts are generated and no errors are recorded in the error registers of the checker. Speculative accesses that violate permissions checks should not be reported immediately as errors via interrupts. In some cases, an error response on the bus transaction enables the initiating agent to take appropriate action if the speculative access attempts to commit.

When a transaction is prevented, if any rule with an address range including any byte of the transaction has the ER or EW bit set for reads and writes respectively, or if no rules overlap the transaction but the slot[0].cfg.ER or slot[0].cfg.EW bit is set for reads and writes respectively, the failed access attempt will report an error in the bus transaction response. The specific error encoding is bus-protocol specific. Reads may return zero data along with the error response, and writes to the target memory location may be ignored. In addition, the error may be recorded in the error registers of the checker.

When a transaction is prevented, but no rule has an address range that includes any byte of the transaction with the ER or EW bit set for reads and writes respectively, or if no rules overlap the transaction and slot[0].cfg.ER or slot[0].cfg.EW are clear for reads and writes respectively, read transactions return zero data with no error in the response, and writes are ignored but are acknowledged with no error in the bus transaction response. Unless the corresponding IR or IW bit is set, no errors are recorded in the error registers of the checker. Some agents and protocols will cause the system to fail when an unexpected error response is received, possibly preventing the permissions violation from being reported and contained. In these cases, the ER/EW bits can be cleared but the violation reported using the IR/IW bits.

Some platforms may provide the ability to "poison" data returned by a failing access to ensure it will cause an exception if consumed, even if consumed much later from a cached copy, but this cannot be assumed to be available in a generic checker interface. Returning zero does have the effect of poisoning instruction fetches for RISC-V harts, for which zero is defined to be an illegal instruction.

When a transaction is prevented, and the appropriate IR, IW, ER, EW bits are all clear, then no errors are recorded in the error registers of the checker. This may prevent a speculative access that should not report permissions failure from blocking the report of a true permissions violation.

When a transaction is prevented, it can cause both a bus-error response and raise an interrupt if the appropriate IR or IW and ER or EW bits are set. In this case, both the errcause.ip and errcause.be bits are set when the error is recorded in the error registers of the checker.

Example of Checker Reset

At reset, all slots may either be initialized to a platform-specific value or the cfg registers must be cleared (e.g., OFF and unlocked).

The errcause.ip and errcause.be fields may be cleared at reset.

Example of Safely Modifying Slot Entries

When modifying the rule in a slot, it is important to not allow a stray transaction to observe an inconsistent rule state in the checker. To provide atomic updates to a rule, software may first turn off the rule using a single 32b write to set the cfg.A[1:0] setting to OFF, then perform any necessary updates to the other registers in the slot, before finally renabling the rule with another write to set the cfg register to the desired value.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

As used herein, the term "data store" refers to circuitry configured to store data, such as, for example, one or more registers, random access memory, flash memory, or one or more flip-flops.

Details

FIG. 1 is a block diagram of an example of an integrated circuit 110 for address range encoding in a system on a chip with a securely partitioned memory space. The integrated circuit 110 includes a processor core 120 configured to execute instructions. The integrated circuit 110 includes an outer memory system 140 configured to store instructions and data and to provide interfaces to peripherals. The processor core 120 includes a data store 122 configured to store one or more hardware security identifiers (e.g., world identifiers), and a marker circuitry 124 (e.g., a world identifier marker circuitry) configured to tag memory requests transmitted on a bus 142 of the integrated circuit 110 by the processor core 120 with a hardware security identifier from the data store 122. The integrated circuit 110 includes checker circuitries 150 and 160 (e.g., world identifier checker circuitries) configured to check memory requests for one or more memory mapped resources that are received via the bus 142 that have been tagged with a hardware security identifier to determine whether to allow or reject access based on the tagged hardware security identifier. The checker circuitry 150 is associated with one or more portions of a memory. The checker circuitry 160 is associated with one or more memory mapped peripherals. The checker circuitries 150 and 160 include one or more data stores (152 and 162) storing an address field, an address range configuration field that indicates whether the address field specifies an upper bound of an address range for a resource or the address field specifies a lower bound and a size of the address range for the resource, and a hardware security list for the resource that specifies which hardware security identifiers supported by the integrated circuit are authorized for access to the resource. The integrated circuit 110 includes a trusted world processor core 170 that has write access to data stores (e.g., registers) storing hardware security identifiers throughout the integrated circuit 110 that are used to tag and to check memory requests on one or more buses of the integrated circuit 110. For example, the integrated circuit 110 may be used to implement the technique 600 of FIG. 6.

The integrated circuit 110 includes a processor core 120 configured to execute instructions. The processor core 120 includes a data store 122 (e.g., one or more registers) configured to store a first hardware security identifier (e.g., a first world identifier). For example, multiple world identifiers that are respectively used by processes executed by the processor core 120 in different privilege modes may be stored in the data store 122. In some implementations, a first hardware security identifier is one of multiple hardware security identifiers stored in the processor core 120 that are each associated with different privilege modes (e.g., machine mode, supervisor mode, and user mode). For example, the integrated circuit 110 may implement a SiFive WorldGuard process-driven scheme. In some implementations, a hardware security identifier (e.g., a first hardware security identifier) is associated with all processes executed by the processor core 120 (e.g., regardless of their privilege modes). For example, the integrated circuit 110 may implement a SiFive WorldGuard core-driven scheme. In some implementations, the data store 122 includes a register storing a world identifier that has a width of n bits with the number of worlds supported by the integrated circuit 110 being 2n=(number of masters+2). This register may be used to mark transactions going out of the master. The data store 122 may be memory mapped to enable the trusted world processor core 170 to write to the data store 122 to assign one or more hardware security identifiers to one or more masters of the processor core 120. In some implementations (not shown in FIG. 1), the data store 122 may be positioned outside of the processor core 120. For example, the data store 122 may be accessed by the processor core 120 via outside wires extending out of the processor core 120.

The processor core 120 includes a marker circuitry 124 (e.g., a world identifier marker circuitry). The marker circuitry 124 may be configured to tag memory requests transmitted on a bus of the integrated circuit 110 by the processor core 120 with a hardware security identifier to confirm authorization to access a portion of memory space addressed by the memory requests. For example, the marker circuitry 124 may be configured to tag memory requests transmitted on a bus 142 of the integrated circuit 110 by the processor core 120 with the first hardware security identifier. For example, in the TileLink bus protocol, the userField field may be used to transmit the hardware security identifier value with the request. For example, the marker circuitry 124 may include logic to select a world identifier associated with a privilege mode of a current process running on the processor core 120 to tag an access request for a resource (e.g., memory or a peripheral).

The integrated circuit 110 includes an outer memory system 140 configured to store instructions and data. The outer memory system 140 may include one or more memories. The outer memory system 140 may include one or more layers of cache. The outer memory system 140 may include memory mapped ports to one or more peripherals. The processor core 120 may be configured to (e.g., using the marker circuitry 124 and the data store 122 storing the one or more hardware security identifiers) tag memory requests transmitted on a bus (e.g., the bus 142) of the integrated circuit 110 by the processor core 120 with a hardware security identifier (e.g., the first hardware security identifier) to confirm authorization to access a portion of memory space addressed by the memory requests.

The integrated circuit 110 includes a checker circuitry 150 configured to check memory requests for one or more memory mapped resources that are received via the bus 142 that have been tagged with a hardware security identifier to determine whether to allow or reject access based on the tagged hardware security identifier (e.g., a world identifier). In this example, the checker circuitry 150 is for a memory (e.g., a random-access memory or a flash memory). For example, the checker circuitry 150 for a resource (e.g., a portion of the memory mapped to a range of addresses) may be configured to check a hardware security identifier that has been used to tag a request on a bus 142 for that resource against a stored hardware security list (e.g., a world list) that specifies one or more hardware security identifiers that are authorized for access to that resource. For example, a world list specifying a world identifier or set of world identifiers for a resource may be stored by a data store 152 in the checker circuitry 150 and may be set by the trusted world processor core 170. The data store 152 may be configured to store a world list for a resource that specifies which world identifiers supported by the integrated circuit 110 are authorized for access to the resource. The checker circuitry 150 may be configured to compare the tagged hardware security identifier to the hardware security list for a resource with an address range including an address of the memory request. In some implementations, the hardware security list is a bit mask with one bit for each hardware security identifier supported by the integrated circuit 110. For example, the checker circuitry 150 may include a WorldGuard filter. For example, the checker circuitry 150 may include a WorldGuard PMP.

The integrated circuit 110 includes a data store 152 configured to store an address field, an address range configuration field that indicates whether the address field specifies an upper bound of an address range for a resource or the address field specifies a lower bound and a size of the address range for the resource, and a hardware security list for the resource that specifies which hardware security identifiers supported by the integrated circuit 110 are authorized for access to the resource. The checker circuitry 150 is configured to determine the address range for the resource based on the address field and the address range configuration field and compare the tagged hardware security identifier of a memory request to the hardware security list when an address of the memory request is within the address range for the resource. For example, the size of the address range may be constrained to be a power of two. In some implementations, the size of the address range is encoded as a string of consecutive ones in the least significant bits of the address field that is terminated by a zero. In some implementations, the address range configuration field also indicates whether access to the resource is enabled. For example, the address range configuration field may be encoded in the format specified by Table 4 supra.

For example, the second data store may be one of multiple data stores 152 corresponding to respective resources for which the checker circuitry 150 controls access. For example, the data stores 152 may include the set of data stores 500 of FIG. 5. In some implementations, the resource is a first resource, the address field is a first address field, the address range configuration field is a first address range configuration field, the hardware security list is a first hardware security list, the address range for the first resource is a first address range, and the integrated circuit comprises a data store (e.g., a third data store) configured to store a second address field, a second address range configuration field that indicates whether the address field specifies an upper bound of a second address range for a second resource or the second address field specifies a lower bound and a size of the second address range for the second resource, and a second hardware security list for the second resource that specifies which hardware security identifiers supported by the integrated circuit are authorized for access to the second resource. The checker circuitry 150 may be configured to, when the first address range configuration field indicates that the first address field specifies an upper bound of the first address range, determine the first address range based on the upper bound specified by the first address field and based on a lower bound determined based on the second address field and the second address range configuration field. In some implementations, when the second address range configuration field indicates that the second address field specifies a lower bound and a size of the second address range, the checker circuitry is configured to determine the lower bound of the first address range as equal to an upper bound of the second address range that is determined based on the lower bound and the size specified by the second address field. For example, access to the second data store 152 may be restricted to the trusted world processor core 170. In this example, the second data store 152 is part of the checker circuitry 150.

If a memory request checks out (i.e., the hardware security identifier that was used to tag the memory request is one of the hardware security identifiers specified by the hardware security list), the checker circuitry 150 may allow the memory request to proceed without incident to provide access to the resource. If a memory request check fails (i.e., the hardware security identifier that was used to tag the memory request is not one of the hardware security identifiers specified by the hardware security list), then the memory request may be rejected by the checker circuitry 150. For example, rejecting a memory request may cause the checker circuitry 150 to, responsive to the rejection of the memory request for the resource, source an interrupt signal; and, responsive to the rejection of the memory request for the resource, send a denied message via the bus 142 in response to the memory request. For example, the trusted world processor core 170 may be configured to receive the interrupt signal.

The checker circuitry 150 may also include a data store configured to store world error data, including the tagged world identifier of a memory request that has been rejected by the checker circuitry 150. For example, the world error data stored in this data store may include an address of a memory request that has been rejected by the checker circuitry 150. For example, the world error data stored in the data store may include an access mode of a memory request that has been rejected by the checker circuitry 150. For example, the data store may include an acknowledgement bit field (e.g., a one-bit field) that indicates whether world error data stored in the data store has been read by an interrupt handling routine. The checker circuitry 150 may be configured to prevent writing of world error data to the data store responsive to rejection of a new memory request when the acknowledgement bit field indicates that current contents of the data store have not been read yet. In some implementations, access to a data store storing world error data is restricted to the trusted world processor core 170.

The integrated circuit 110 includes a checker circuitry 160 configured to check memory requests for one or more memory mapped resources that are received via the bus 142 that have been tagged with a hardware security identifier (e.g., a world identifier) to determine whether to allow or reject access based on the tagged hardware security identifier. In this example, the world identifier checker circuitry 160 is for one or more peripherals (e.g., a serial port). For example, the checker circuitry 160 for a resource (e.g., network adapter) may be configured to check a hardware security identifier that has been used to tag a request on a bus 142 for that resource against a stored hardware security list that specifies one or more hardware security identifiers that are authorized for access to that resource. For example, a hardware security list specifying a hardware security identifier or set of hardware security identifiers for a resource may be stored by a data store 162 in the checker circuitry 160 and may be set by the trusted world processor core 170. The data store 162 may be configured to store a hardware security list for a resource that specifies which world identifiers supported by the integrated circuit 110 are authorized for access to the resource. The checker circuitry 160 may be configured to compare the tagged hardware security identifier to the hardware security list. In some implementations, the hardware security list is a bit mask with one bit for each hardware security identifier supported by the integrated circuit 110. For example, the checker circuitry 160 may include a WorldGuard filter.

The integrated circuit 110 includes a data store 162 configured to store an address field, an address range configuration field that indicates whether the address field specifies an upper bound of an address range for a resource or the address field specifies a lower bound and a size of the address range for the resource, and a hardware security list for the resource that specifies which hardware security identifiers supported by the integrated circuit 110 are authorized for access to the resource. The checker circuitry 160 is configured to determine the address range for the resource based on the address field and the address range configuration field and compare the tagged hardware security identifier of a memory request to the hardware security list when an address of the memory request is within the address range for the resource. For example, the size of the address range may be constrained to be a power of two. In some implementations, the size of the address range is encoded as a string of consecutive ones in the least significant bits of the address field that is terminated by a zero. In some implementations, the address range configuration field also indicates whether access to the resource is enabled. For example, the address range configuration field may be encoded in the format specified by Table 4 supra.

For example, the second data store may be one of multiple data stores 162 corresponding to respective resources for which the checker circuitry 160 controls access. For example, the data stores 162 may include the set of data stores 500 of FIG. 5. In some implementations, the resource is a first resource, the address field is a first address field, the address range configuration field is a first address range configuration field, the hardware security list is a first hardware security list, the address range for the first resource is a first address range, and the integrated circuit comprises a data store (e.g., a third data store) configured to store a second address field, a second address range configuration field that indicates whether the address field specifies an upper bound of a second address range for a second resource or the second address field specifies a lower bound and a size of the second address range for the second resource, and a second hardware security list for the second resource that specifies which hardware security identifiers supported by the integrated circuit are authorized for access to the second resource. The checker circuitry 160 may be configured to, when the first address range configuration field indicates that the first address field specifies an upper bound of the first address range, determine the first address range based on the upper bound specified by the first address field and based on a lower bound determined based on the second address field and the second address range configuration field. In some implementations, when the second address range configuration field indicates that the second address field specifies a lower bound and a size of the second address range, the checker circuitry is configured to determine the lower bound of the first address range as equal to an upper bound of the second address range that is determined based on the lower bound and the size specified by the second address field. For example, access to the second data store 162 may be restricted to the trusted world processor core 170. In this example, the second data store 162 is part of the checker circuitry 160.

If a memory request checks out (i.e., the hardware security identifier that was used to tag the memory request is one of the hardware security identifiers specified by the hardware security list), the checker circuitry 160 may allow the memory request to proceed without incident to provide access to the resource. If a memory request check fails (i.e., the hardware security identifier that was used to tag the memory request is not one of the hardware security identifiers specified by the hardware security list), then the memory request may be rejected by the checker circuitry 160. For example, rejecting a memory request may cause the checker circuitry 160 to, responsive to the rejection of the memory request for the resource, source an interrupt signal; and, responsive to the rejection of the memory request for the resource, send a denied message via the bus 142 in response to the memory request. For example, the trusted world processor core 170 may be configured to receive the interrupt signal.

The integrated circuit 110 includes a trusted world processor core 170 that has write access to data stores (e.g., registers) storing hardware security identifiers (e.g., world identifiers) throughout the integrated circuit 110 that are used to tag memory requests on one or more buses of the integrated circuit 110. The trusted world processor core 170 may also have write access to data stores in checker circuitry (150 and 160). For example, a world list may be written to the data store 152 by the trusted world processor core 170. In some implementations, the trusted world processor core 170 is the only master of the integrated circuit 110 that has access to these data stores (122, 152, and 162). For example, a hardware security list stored in the data store 152 may be set and locked during a boot routine.

In some implementations (not shown in FIG. 1), the processor core 120 may be the trusted world processor core for its integrated circuit. For example, the trusted world processor core can simply be the processor 120 core running some trusted software in the context of a trusted world. When the world changes (e.g., from the trusted world identifier to another world identifier), the processor core 120 is not considered as trusted because its state is not the trusted state.

Figure 2:
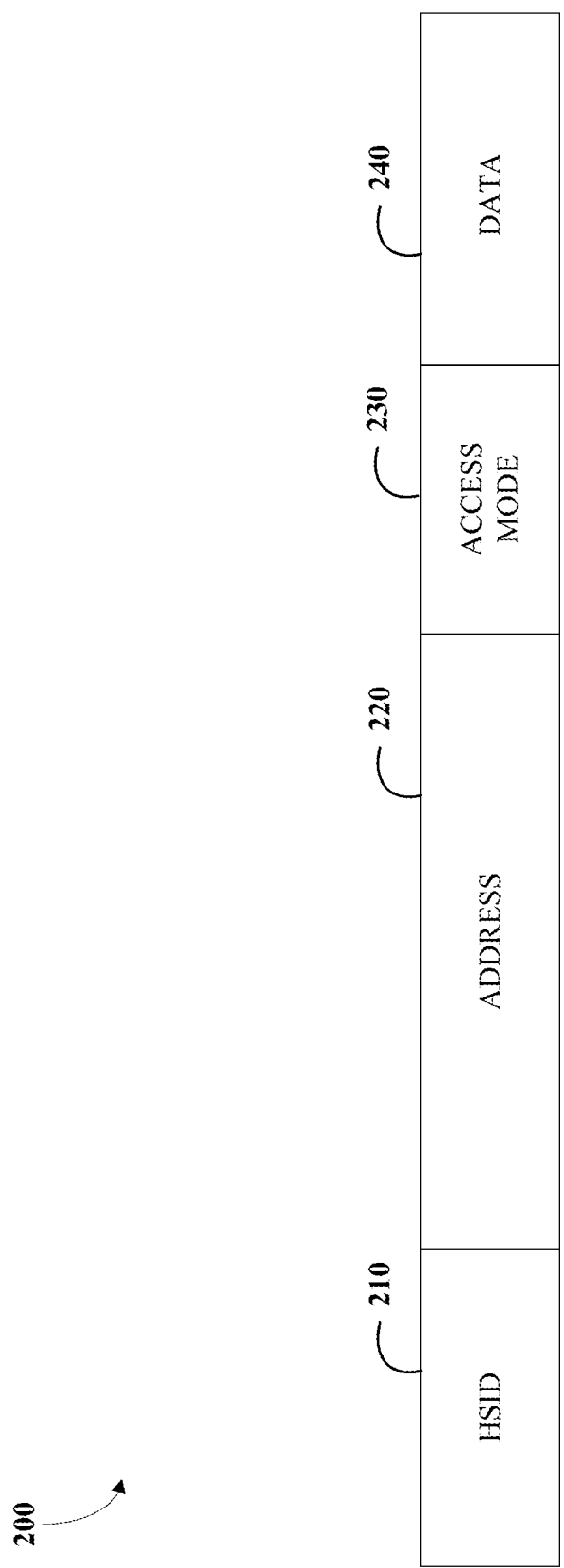
FIG. 2 is a block diagram of an example of a memory request that is transmitted and received via a bus.

FIG. 2 is a block diagram of an example of a memory request 200 that is transmitted and received via a bus (e.g., the bus 142). The memory request 200 may have seek access to a memory mapped resource (e.g., a portion of memory or a peripheral). The memory request 200 may be rejected because its associated hardware security identifier 210 (e.g., a world identifier) that does not match an authorized hardware security identifier for the resource. The bus may include conductors configured to transmit a hardware security identifier 210 associated with (e.g., that was used to tag on the bus) the memory request 200. The bus may include conductors configured to transmit an address 220 of the memory request 200. The bus may include conductors configured to transmit an access mode 230 (e.g., read or write) of the memory request 200. The bus may include conductors configured to transmit data 240 of the memory request 200 (e.g., data to be written to the resource).

Figure 3:
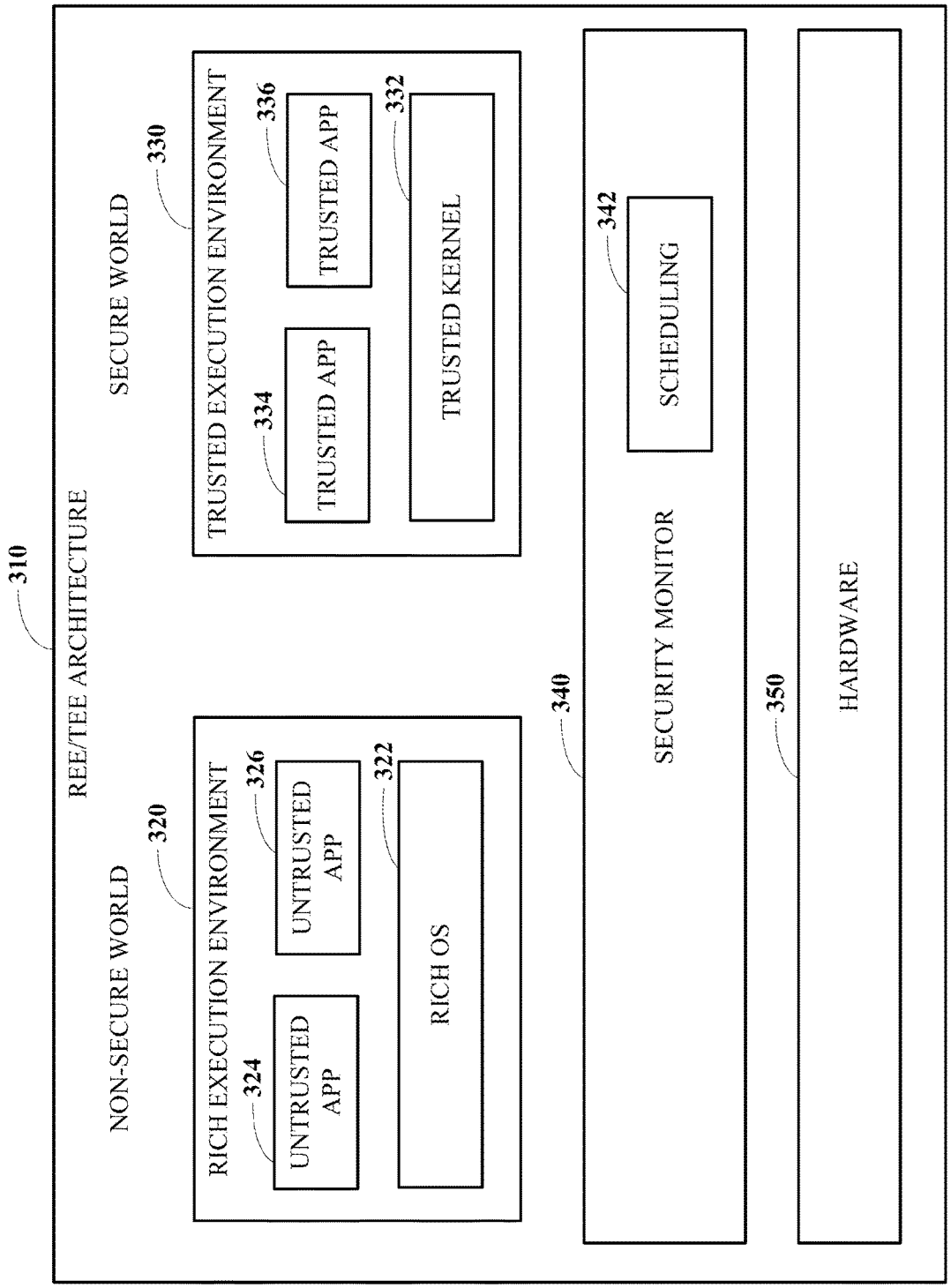
FIG. 3 is a block diagram of an example of an architecture for secure computing.

FIG. 3 is a block diagram of an example of an architecture 310 for secure computing. An example is to have a core "hosting" two worlds, the world 1 accessing the most sensitive assets (e.g., keys) and to some specific peripherals (e.g., the fingerprint reader on a smartphone), and the world 2 running generic application software. On the subordinate side, each memory or peripheral has an access control list (ACL) containing the access rights per world identifier. Through the communication bus, each marked request coming from a master is sent to a subordinate and analyzed versus its ACL. These ACL check circuits have functions very similar to the PMPs functioning with the world identifier, WID, field acting as an additional field to be checked. This mark-and-check strategy allows very complex and rich architectures to be easily secured as a wrong or missing world identifier implies the immediate rejection of the request. There is no theoretical limitation in the number of supported worlds for a specific platform, being then consistent with the software-only proposal above: the number of worlds a system on a chip (SoC) can support is application-dependent and may be determined by the application architect.

The architecture 310 includes a rich execution environment 320 that operates in a non-secure world. The rich execution environment 320 includes untrusted applications (324 and 326) that run on a rich operating system 322.

The architecture 310 includes a trusted execution environment 330 that operates in a secure world. The trusted execution environment 330 includes trusted applications (334 and 336) that run on a trusted kernel 332.

The architecture 310 includes a security monitor 340. The security monitor 340 is in charge of switches management between secure and non-secure states. The security monitor 340 may manage the context switches (e.g., save and restore). The security monitor 340 is also in charge of interrupts handling. The security monitor 340 includes a scheduling module 342. The architecture 310 includes hardware 350 which may be a single processor core or multiple processor cores.

For example, the untrusted applications (324 and 326) and the rich operating system 322 may be associated with a first world identifier that their resource (e.g., memory or peripheral) access requests are tagged with. For example, the trusted applications (334 and 336) and the trusted kernel 332 may be associated with a second world identifier that their resource (e.g., memory or peripheral) access requests are tagged with.

Figure 4:
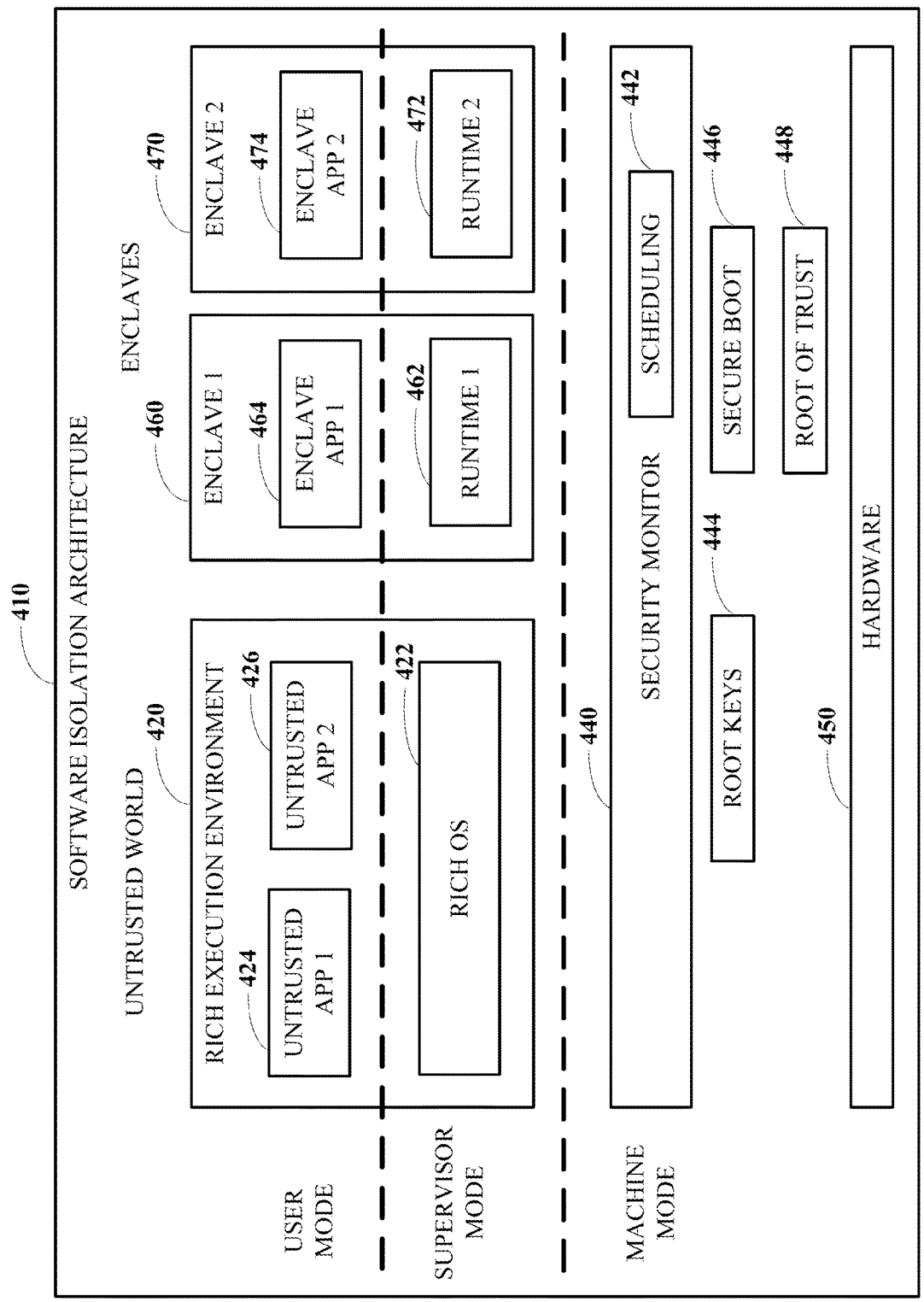
FIG. 4 is a block diagram of an example of an architecture for software isolation on a single core.

FIG. 4 is a block diagram of an example of an architecture 410 for software isolation on a single core. The architecture 410 includes a rich execution environment 420 running in an untrusted world. The rich execution environment 420 includes untrusted applications (424 and 426) running on a rich operating system 422.

The architecture 410 includes a security monitor 440. The security monitor 440 includes a scheduling module 442. The architecture 410 includes root keys 444, a secure boot module 446, and a root of trust 448. The architecture 410 includes hardware 450 which, in this example, is a single processor core.

The architecture 410 includes a first enclave 460 that includes an enclave application 464 running on a runtime operating system 462. The architecture 410 includes a second enclave 470 that includes an enclave application 474 running on a runtime operating system 472.

The untrusted applications (424 and 426) and the enclave applications (464 and 474) may use the privilege mode of user mode. The rich operating system 422 and the runtime operating systems (462 and 472) may use the privilege mode of supervisor mode. The security monitor 440, the root keys 444, the secure boot module 446, and the root of trust 448 may use the privilege mode of machine mode.

In some implementations, the untrusted applications (424 and 426) and the rich operating system 422 use a shared world identifier. For example, the security monitor 440, the root keys 444, the secure boot module 446, and the root of trust 448 may all use a common trusted world identifier. For example, the enclave applications (464 and 474) and the runtime operating systems (462 and 472) may each have their own unique world identifiers.

Examples of architectures are described in FIG. 3 (REE/TEE architecture) and FIG. 4 (Keystone enclave solution). This approach is based on a secure monitor, able to manage the different independent pieces of software. These pieces can be named boxes, containers, or blocks but the idea is to have them not managing the privilege modes, as this function is only available to the security monitor 440. The boxes resources (memories, peripherals) and Inter-boxes communications are also dynamically controlled and allocated by the hypervisor, upon request from the boxes.

On very flexible platforms, such as RISC-V-based products, it may be advantageous to attribute any important function or task to only one single container, separated from the others: one container for the cryptographic, another one for the communication library, one for the data sensors, one for the main application. An example of a software architecture would be to have the secure monitor running in machine mode (M-mode), controlling containers. Each of the containers could be made of two parts, one, the operating system, running in supervisor mode (S-mode) and the application task, running in user mode (U-mode).

The debug mechanisms may be adapted to conform to the WorldGuard principles and the platform configuration. If required, the debug shall be prevented for certain worlds, for their software and their resources (e.g., memories and peripherals). This scenario is typical of a software architecture where some portions of the code, for example the TEE or the secure enclave, are not accessible to the application developer and so shall not be available to the debug module while the application that is currently developed shall be available to the debug module.

For example, a world associated with a rich execution environment may be available for application debugging while the other worlds (security monitor, enclaves) may not.

For example, consider a WorldGuard platform with a maximum number of NWorlds worlds. A debugwid-list list may be set that is made of NWorlds bits, each bit representing a WID value (among all the possible worlds values) and the ability for the debug module to perform debugging operations for this WID value (i.e., debugging software running on the core with this current WID value). Therefore, a combinatorial function of wgMarker WID value and the debugwid-list information generates a final debug-wg-authorized signal. This signal may then be combined with other signals that prevent debug for non-authorized WIDs. This signal is used to allow or prevent the debug interrupt to be taken and to jump to the debug handler in debug ROM. In some implementations, the debug interrupt signal itself still reaches the core, but the debug-wg-authorized signal decides whether to take the interrupt or ignore it. As a result, the debug ROM code is not used when the WID debug is not authorized.

Assuming now the debug is authorized and so, the debug interrupt has been taken, the debug operations may be to access some CSRs and/or some data in the memory. Therefore, care may be taken to validate the access of these CSRs with the current WID value. Similarly, the data access may be granted according to the data address consistency with the current WID value. However, as the debug ROM code runs in debug mode which grants any access, the privileged mode used for the access control shall come from the desr.prv instead of the mstatus.prv. This rule may imply some modifications and some consequences. For example, one modification is that the hardware logic in the CSR module of the processor core may be modified to check dcsr.prv instead of mstatus.prv against the CSR number, if the mstatus.prv is the debug mode.

Figure 5:
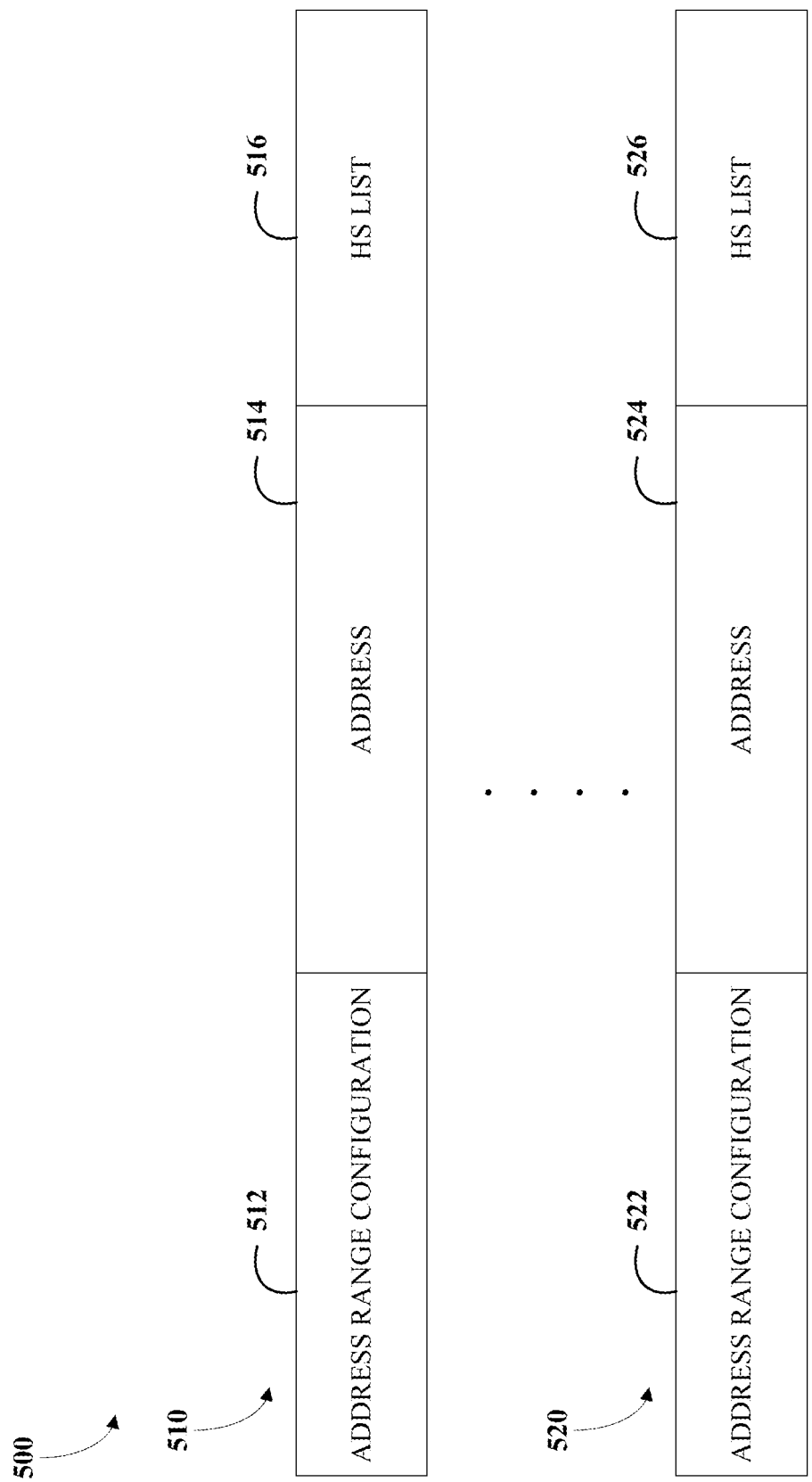
FIG. 5 is a memory map of an example of a set of data stores configured to store configuration data for hardware security checker circuitry associated with respective memory mapped resources.

FIG. 5 is a memory map of an example of a set of data stores 500 configured to store configuration data for hardware security checker circuitry associated with respective memory mapped resources. The set of data stores 500 includes a first data store 510 storing an entry of hardware security configuration data associated with a memory mapped resource (e.g., a page of memory or a peripheral) of an integrated circuit. The first data store 510 is configured to store an address field 514, an address range configuration field 512 that indicates whether the address field 514 specifies an upper bound of an address range for a resource or the address field 514 specifies a lower bound and a size of the address range for the resource, and a hardware security list 516 for the resource that specifies which hardware security identifiers (e.g., world identifiers) supported by the integrated circuit are authorized for access to the resource. A checker circuitry (e.g., the checker circuitry 150) may be configured to determine the address range for the resource based on the address field 512 and the address range configuration field 514 and compare a tagged hardware security identifier of a memory request to the hardware security list 516 when an address of the memory request is within the address range for the resource. In some implementations, the size of the address range is constrained to be a power of two. In some implementations, the size of the address range is encoded as a string of consecutive ones in the least significant bits of the address field 514 that is terminated by a zero (e.g., as shown in Table 5 supra). For example, the first data store 510 may store a checker slot configuration in the format specified in Table 2 supra. In some implementations, the address range configuration field 512 also indicates whether access to the resource is enabled. For example, the address range configuration field 512 may store an address range configuration in the format specified in Table 4 supra.

The set of data stores 500 includes a second data store 520 storing an entry of hardware security configuration data associated with a second memory mapped resource (e.g., a page of memory or a peripheral) of the integrated circuit. The second data store 520 is configured to store an second address field 524, an second address range configuration field 522 that indicates whether the second address field 524 specifies an upper bound of an address range for the second resource or the second address field 524 specifies a lower bound and a size of the second address range for the second resource, and a second hardware security list 526 for the second resource that specifies which hardware security identifiers (e.g., world identifiers) supported by the integrated circuit are authorized for access to the second resource. A checker circuitry may be configured to determine the second address range for the second resource based on the second address field 522 and the second address range configuration field 524 and compare a tagged hardware security identifier of a memory request to the second hardware security list 526 when an address of the memory request is within the second address range for the second resource. In some implementations, the size of the second address range is constrained to be a power of two. In some implementations, the size of the second address range is encoded as a string of consecutive ones in the least significant bits of the address field 524 that is terminated by a zero (e.g., as shown in Table 5 supra). For example, the second data store 520 may store a checker slot configuration in the format specified in Table 2 supra. In some implementations, the second address range configuration field 522 also indicates whether access to the second resource is enabled. For example, the second address range configuration field 522 may store an address range configuration in the format specified in Table 4 supra.

In some implementations, a checker circuitry (e.g., the checker circuitry 160) is configured to, when the first address range configuration field 512 indicates that the first address field 514 specifies an upper bound of a first address range, determine the first address range based on the upper bound specified by the first address field 514 and based on a lower bound determined based on the second address field 524 and the second address range configuration field 522. For example, when the second address range configuration field 522 indicates that the second address field 524 specifies a lower bound and a size of the second address range, the checker circuitry may be configured to determine the lower bound of the first address range as equal to an upper bound of the second address range that is determined based on the lower bound and the size specified by the second address field 524.

Figure 6:
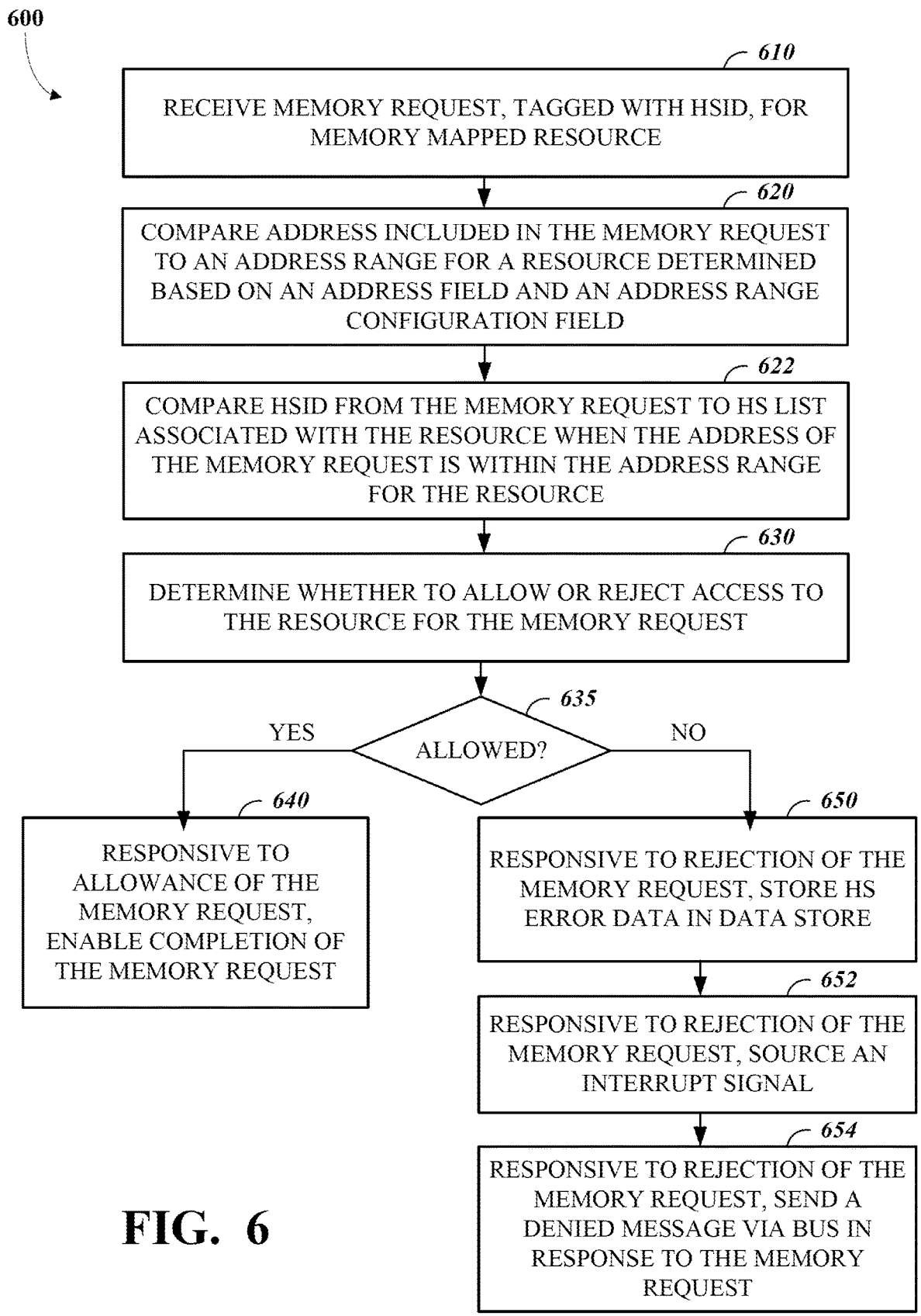
FIG. 6 is a flow chart of an example of a technique for address range encoding in a system on a chip with a securely partitioned memory space.

FIG. 6 is a flow chart of an example of a technique 600 for address range encoding in a system on a chip with a securely partitioned memory space. The technique 600 includes receiving 610, via a bus from a processor core, a memory request for a memory mapped resource; comparing 620 an address included in the memory request to an address range for a resource, wherein the address range is determined based on an address field and an address range configuration field; comparing 622 a first hardware security identifier from the memory request to a hardware security list associated with the resource when the address of the memory request is within the address range for the resource; and, based on the comparison of the first hardware security identifier with the hardware security list, determining 630 whether to allow or reject access to the resource for the memory request. At 635, if the memory request is allowed, then the technique 600 includes, responsive to the allowance of the memory request, enabling 640 completion of the access requested by the memory request. At 635, if the memory request is rejected, then the technique 600 includes, responsive to rejection of access to the resource for the memory request, storing 650 hardware security error data, including the first hardware security identifier, in a data store. The technique 600 also includes, responsive to the rejection of the memory request for the resource, sourcing 652 an interrupt signal; and, responsive to the rejection of the memory request for the resource, sending 654 a denied message via the bus in response to the memory request. For example, the technique 600 may be implemented using the integrated circuit 110 of FIG. 1.

The technique 600 includes receiving 610, via a bus from a processor core, a memory request for a memory mapped resource (e.g., a portion of memory or a peripheral). The memory request is tagged with a first hardware security identifier (e.g., a first world identifier). In some implementations, the memory request is transmitted on the bus using a bus protocol (e.g., the TileLink bus protocol). For example, in the TileLink bus protocol, the userField field may be used to transmit the hardware security identifier value with the request. For example, a hardware security identifier associated with a privilege mode of a current process running on the processor core (e.g., the processor core 120) may have been selected to tag an access request for a resource. In some implementations, the hardware security identifier is the only hardware security identifier used by the processor core. For example, the memory request may be received 610 by a slave (e.g., a memory controller) connected to the bus and this slave may implement checker logic (e.g., using the checker circuitry 150).

The technique 600 includes comparing 620 an address included in the memory request to an address range for a resource (e.g., a portion of memory or a peripheral). The address range is determined based on an address field and an address range configuration field (e.g., from the data store 500 of FIG. 5). In some implementations, the resource is a first resource, the address field is a first address field, the address range configuration field is a first address range configuration field, the hardware security list is a first hardware security list, the address range for the first resource is a first address range, and the technique 600 includes, when the first address range configuration field indicates that the first address field specifies an upper bound of the first address range, determining the first address range based on the upper bound specified by the first address field and based on a lower bound determined based on a second address field and a second address range configuration field. The second address range configuration field indicates whether the second address field specifies an upper bound of a second address range for a second resource or the second address field specifies a lower bound and a size of the second address range for the second resource. In some implementations, when the second address range configuration field indicates that the second address field specifies a lower bound and a size of the second address range, determining the lower bound of the first address range as equal to an upper bound of the second address range that is determined based on the lower bound and the size specified by the second address field. For example, a size of the address range may be constrained to be a power of two. In some implementations, a size of the address range is encoded as a string of consecutive ones in the least significant bits of the address field that is terminated by a zero (e.g., as described in Table 5 supra). For example, the address range configuration field may also indicate whether access to the resource is enabled (e.g., as described in Table 4 supra).

The technique 600 includes comparing 622 the first hardware security identifier from the memory request to a hardware security list (e.g., a world list) associated with the resource when the address of the memory request is within the address range for the resource. The hardware security list specifies which hardware security identifiers supported by an integrated circuit are authorized for access to the resource. For example, the hardware security list may be stored as a list of hardware security identifiers, and the first world identifier may be compared 622 by applying logic to determine if the first hardware security identifier is equal to one of the hardware security identifiers stored in the hardware security list. In some implementations, the hardware security list is stored as a bit mask with one bit for each hardware security identifier supported by the integrated circuit, and the first hardware security identifier may be compared 622 by applying shift logic to determine if the bit of the hardware security list corresponding to the first hardware security identifier is active (e.g., active high or active low).

The technique 600 includes, based on the comparison of the first hardware security identifier with the hardware security list, determining 630 whether to allow or reject access to the resource for the memory request. For example, if the comparison indicates that the first hardware security identifier is a member of the set of authorized worlds encoded by the hardware security list, then the memory request may be determined 630 to be allowed. Otherwise, the memory request may be determined 630 to be rejected.

At 635, if the memory request is allowed, then the technique 600 includes, responsive to allowance of the memory request, enabling 640 completion of the access (e.g., writing to or reading from the resource) requested by the memory request.

At 635, if the memory request is rejected, then the technique 600 includes, responsive to rejection of access to the resource for the memory request, storing 650 hardware security error data in a data store. The hardware security error data (e.g., world error data) may include the first hardware security identifier from the memory request. For example, the hardware security error data stored 650 in the data store may include an address of the memory request. For example, the hardware security error data stored 650 in the data store may include an access mode (e.g., read, write, or execute) of the memory request. For example, the hardware security error data stored 650 in the data store may include an acknowledgement bit field (e.g., a single bit) that indicates whether hardware security error data stored in the data store has been read by an interrupt handling routine. The acknowledgement bit field may be used to preserve error data for a first violation in a sequence of violations until it can be accessed (e.g., by an interrupt handling routine). In some implementations, the technique 600 includes preventing writing of hardware security error data to the data store responsive to rejection of a new memory request when the acknowledgement bit field indicates that current contents of the data store have not been read yet. In some implementations, access to the data store (e.g., the data store 162 is restricted to a trusted world processor core.

The technique 600 includes, responsive to the rejection of the memory request for the resource, sourcing 652 an interrupt signal. For example, this interrupt signal can be a source for the interrupt controller. In that case, an interrupt handler can be run in case a violation occurs. Any core can theoretically register to this interrupt signal. It may be preferred to have the core running for the trusted world to register to this interrupt signal, as this core may be dedicated to security monitoring. For example, a trusted world processor core (e.g., the trusted world processor core 170) may be configured to receive the interrupt signal. For single-core platforms, the trusted core and the local core may be the same core.

The technique 600 includes, responsive to the rejection of the memory request for the resource, sending 654 a denied message via the bus in response to the memory request. In some implementations, access to the data store is restricted to a trusted world processor core, and the technique 600 includes, responsive to receiving the denied message, sending a request to the trusted world processor core for information stored in the data store.

Figure 7:
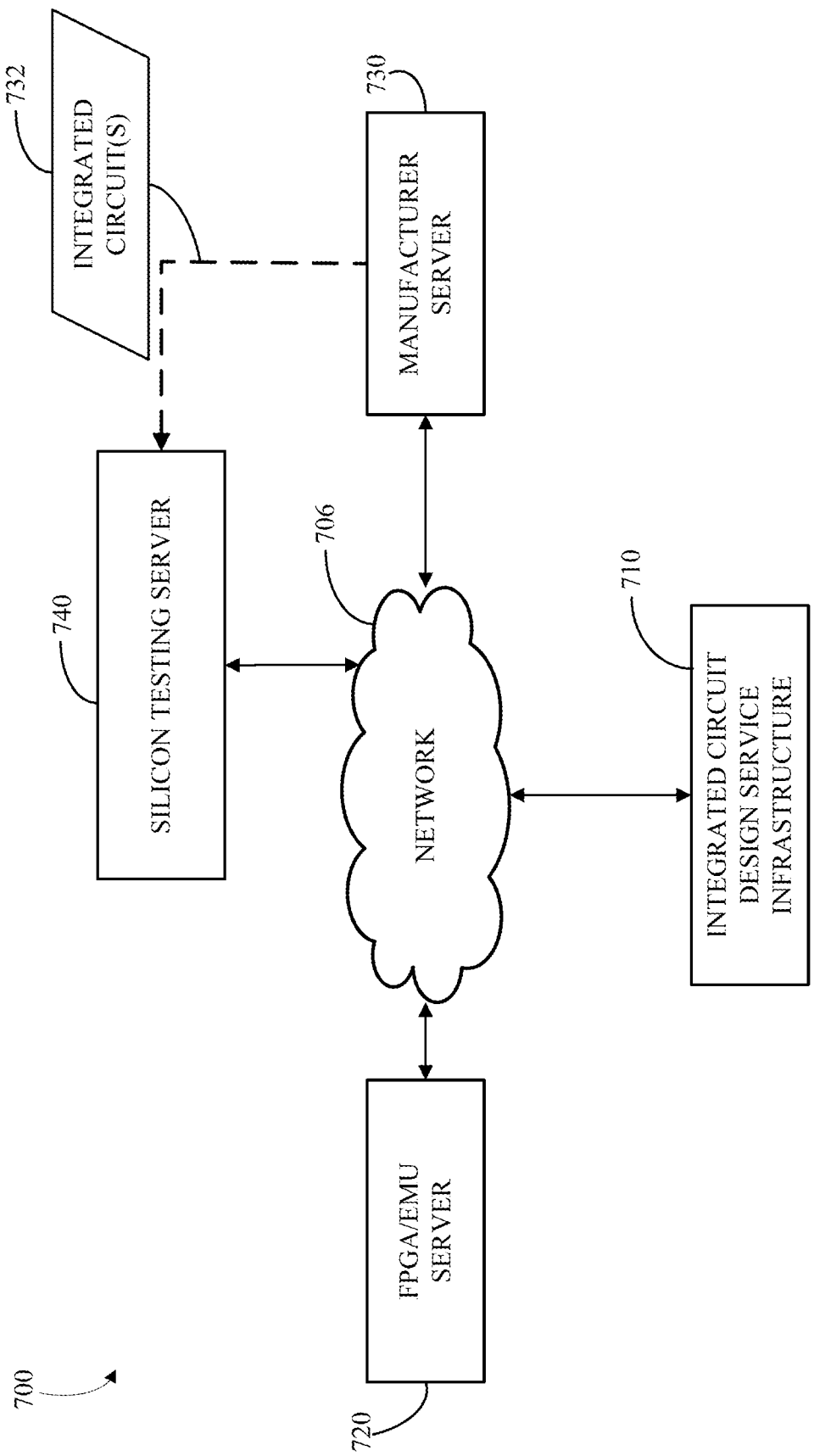
FIG. 7 is a block diagram of an example of a system for facilitating generation and manufacture of integrated circuits.

FIG. 7 is a block diagram of an example of a system 700 for generation and manufacture of integrated circuits. The system 700 includes a network 706, an integrated circuit design service infrastructure 710, a field programmable gate array (FPGA)/emulator server 720, and a manufacturer server 730. For example, a user may utilize a web client or a scripting API client to command the integrated circuit design service infrastructure 710 to automatically generate an integrated circuit design based on a set of design parameter values selected by the user for one or more template integrated circuit designs. In some implementations, the integrated circuit design service infrastructure 710 may be configured to generate an integrated circuit design that includes the circuitry shown and described in FIG. 1.

The integrated circuit design service infrastructure 710 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 710 may invoke (e.g., via network communications over the network 706) testing of the resulting design that is performed by the FPGA/emulation server 720 that is running one or more FPGAs or other types of hardware or software emulators. For example, the integrated circuit design service infrastructure 710 may invoke a test using a field programmable gate array, programmed based on a field programmable gate array emulation data structure, to obtain an emulation result. The field programmable gate array may be operating on the FPGA/emulation server 720, which may be a cloud server. Test results may be returned by the FPGA/emulation server 720 to the integrated circuit design service infrastructure 710 and relayed in a useful format to the user (e.g., via a web client or a scripting API client).

The integrated circuit design service infrastructure 710 may also facilitate the manufacture of integrated circuits using the integrated circuit design in a manufacturing facility associated with the manufacturer server 730. In some implementations, a physical design specification (e.g., a graphic data system (GDS) file, such as a GDS II file) based on a physical design data structure for the integrated circuit is transmitted to the manufacturer server 730 to invoke manufacturing of the integrated circuit (e.g., using manufacturing equipment of the associated manufacturer). For example, the manufacturer server 730 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 710 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 710 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 730 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 732, update the integrated circuit design service infrastructure 710 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 710 on the status of the packaging and delivery process periodically or asynchronously. In some implementations, status updates may be relayed to the user when the user checks in using the web interface and/or the controller might email the user that updates are available.

In some implementations, the resulting integrated circuits 732 (e.g., physical chips) are delivered (e.g., via mail) to a silicon testing service provider associated with a silicon testing server 740. In some implementations, the resulting integrated circuits 732 (e.g., physical chips) are installed in a system controlled by silicon testing server 740 (e.g., a cloud server) making them quickly accessible to be run and tested remotely using network communications to control the operation of the integrated circuits 732. For example, a login to the silicon testing server 740 controlling a manufactured integrated circuits 732 may be sent to the integrated circuit design service infrastructure 710 and relayed to a user (e.g., via a web client). For example, the integrated circuit design service infrastructure 710 may control testing of one or more integrated circuits 732, which may be structured based on an RTL data structure.

Figure 8:
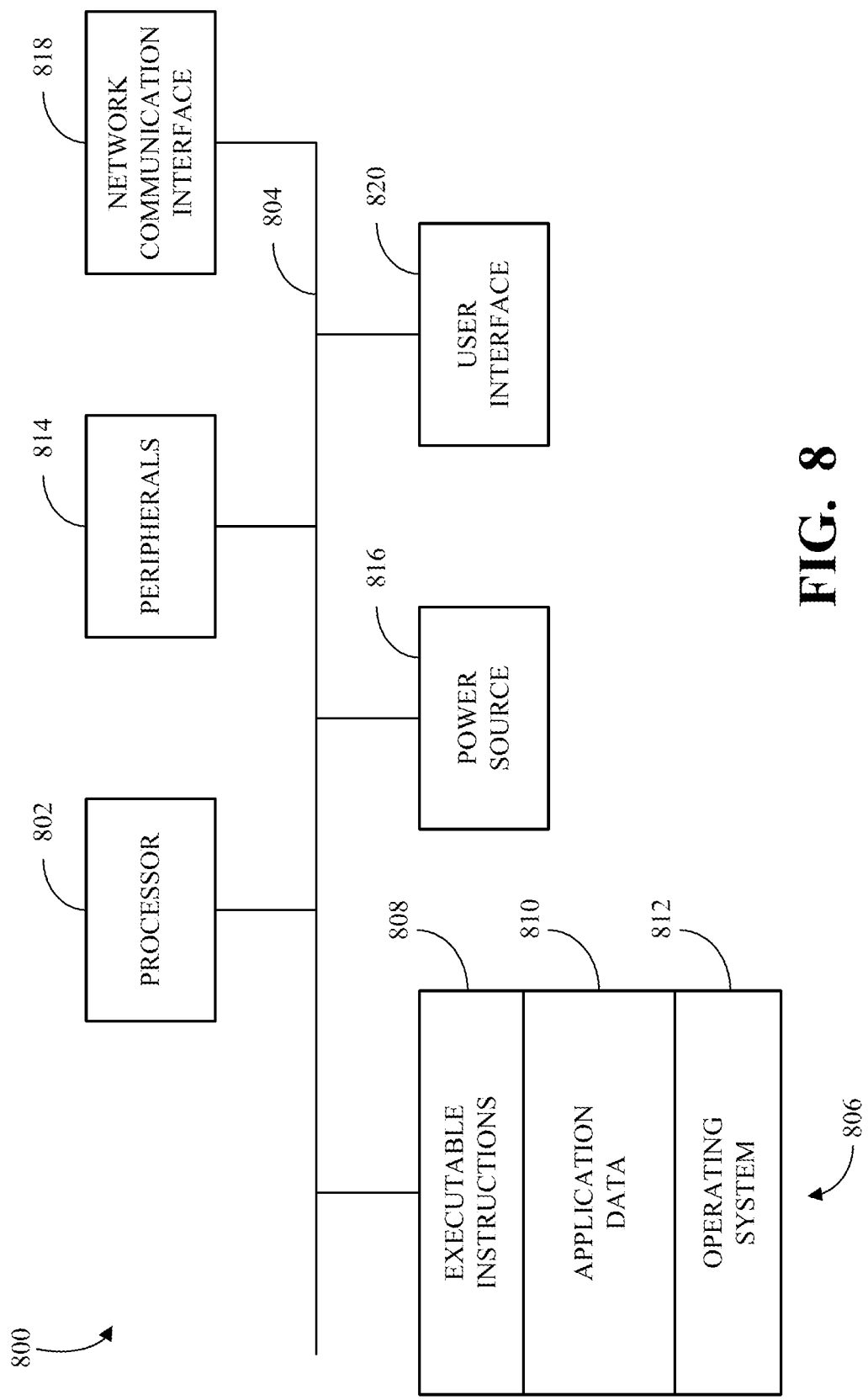
FIG. 8 is a block diagram of an example of a system for facilitating generation of integrated circuits.

FIG. 8 is a block diagram of an example of a system 800 for facilitating generation of integrated circuits, for facilitating generation of a circuit representation for an integrated circuit, and/or for programming or manufacturing an integrated circuit. The system 800 is an example of an internal configuration of a computing device. The system 800 may be used to implement the integrated circuit design service infrastructure 710, and/or to generate a file that generates a circuit representation of an integrated circuit design including the circuitry shown and described in FIG. 1. The system 800 can include components or units, such as a processor 802, a bus 804, a memory 806, peripherals 814, a power source 816, a network communication interface 818, a user interface 820, other suitable components, or a combination thereof.

The processor 802 can be a central processing unit (CPU), such as a microprocessor, and can include single or multiple processors having single or multiple processing cores. Alternatively, the processor 802 can include another type of device, or multiple devices, now existing or hereafter developed, capable of manipulating or processing information.

For example, the processor 802 can include multiple processors interconnected in any manner, including hardwired or networked, including wirelessly networked. In some implementations, the operations of the processor 802 can be distributed across multiple physical devices or units that can be coupled directly or across a local area or other suitable type of network. In some implementations, the processor 802 can include a cache, or cache memory, for local storage of operating data or instructions.

The memory 806 can include volatile memory, non-volatile memory, or a combination thereof. For example, the memory 806 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 806 can include another type of device, or multiple devices, now existing or hereafter developed, capable of storing data or instructions for processing by the processor 802. The processor 802 can access or manipulate data in the memory 806 via the bus 804. Although shown as a single block in FIG. 8, the memory 806 can be implemented as multiple units. For example, a system 800 can include volatile memory, such as RAM, and persistent memory, such as a hard drive or other storage.

The memory 806 can include executable instructions 808, data, such as application data 810, an operating system 812, or a combination thereof, for immediate access by the processor 802. The executable instructions 808 can include, for example, one or more application programs, which can be loaded or copied, in whole or in part, from non-volatile memory to volatile memory to be executed by the processor 802. The executable instructions 808 can be organized into programmable modules or algorithms, functional programs, codes, code segments, or combinations thereof to perform various functions described herein. For example, the executable instructions 808 can include instructions executable by the processor 802 to cause the system 800 to automatically, in response to a command, generate an integrated circuit design and associated test results based on a design parameters data structure. The application data 810 can include, for example, user files, database catalogs or dictionaries, configuration information or functional programs, such as a web browser, a web server, a database server, or a combination thereof. The operating system 812 can be, for example, Microsoft Windows®, macOS®, or Linux®; an operating system for a small device, such as a smartphone or tablet device; or an operating system for a large device, such as a mainframe computer. The memory 806 can comprise one or more devices and can utilize one or more types of storage, such as solid state or magnetic storage.

The peripherals 814 can be coupled to the processor 802 via the bus 804. The peripherals 814 can be sensors or detectors, or devices containing any number of sensors or detectors, which can monitor the system 800 itself or the environment around the system 800. For example, a system 800 can contain a temperature sensor for measuring temperatures of components of the system 800, such as the processor 802. Other sensors or detectors can be used with the system 800, as can be contemplated. In some implementations, the power source 816 can be a battery, and the system 800 can operate independently of an external power distribution system. Any of the components of the system 800, such as the peripherals 814 or the power source 816, can communicate with the processor 802 via the bus 804.

The network communication interface 818 can also be coupled to the processor 802 via the bus 804. In some implementations, the network communication interface 818 can comprise one or more transceivers. The network communication interface 818 can, for example, provide a connection or link to a network, such as the network 706 shown in FIG. 7, via a network interface, which can be a wired network interface, such as Ethernet, or a wireless network interface. For example, the system 800 can communicate with other devices via the network communication interface 818 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 820 can include a display; a positional input device, such as a mouse, touchpad, touchscreen, or the like; a keyboard; or other suitable human or machine interface devices. The user interface 820 can be coupled to the processor 802 via the bus 804. Other interface devices that permit a user to program or otherwise use the system 800 can be provided in addition to or as an alternative to a display. In some implementations, the user interface 820 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 814. The operations of the processor 802 can be distributed across multiple clients or servers, which can be coupled directly or across a local area or other suitable type of network. The memory 806 can be distributed across multiple clients or servers, such as network-based memory or memory in multiple clients or servers performing the operations of clients or servers. Although depicted here as a single bus, the bus 804 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In a first aspect, the subject matter described in this specification can be embodied in an integrated circuit for executing instructions that includes a processor core configured to execute instructions; a first data store configured to store a first hardware security identifier; a marker circuitry configured to tag memory requests transmitted on a bus of the integrated circuit by the processor core with the first hardware security identifier; a checker circuitry configured to check memory requests for one or more memory mapped resources that are received via the bus that have been tagged with a hardware security identifier to determine whether to allow or reject access based on the tagged hardware security identifier; and a second data store configured to store an address field, an address range configuration field that indicates whether the address field specifies an upper bound of an address range for a resource or the address field specifies a lower bound and a size of the address range for the resource, and a hardware security list for the resource that specifies which hardware security identifiers supported by the integrated circuit are authorized for access to the resource, wherein the checker circuitry is configured to determine the address range for the resource based on the address field and the address range configuration field and compare the tagged hardware security identifier of a memory request to the hardware security list when an address of the memory request is within the address range for the resource.

In a second aspect, the subject matter described in this specification can be embodied in methods that include receiving, via a bus from a processor core, a memory request for a memory mapped resource, wherein the memory request is tagged with a first hardware security identifier; comparing an address included in the memory request to an address range for a resource, wherein the address range is determined based on an address field and an address range configuration field; comparing the first hardware security identifier from the memory request to a hardware security list associated with the resource when the address of the memory request is within the address range for the resource, wherein the hardware security list specifies which hardware security identifiers supported by an integrated circuit are authorized for access to the resource; and, based on the comparison of the first hardware security identifier with the hardware security list, determining whether to allow or reject access to the resource for the memory request.

In a third aspect, the subject matter described in this specification can be embodied in a non-transitory computer readable medium comprising a circuit representation that, when processed by a computer, is used to program or manufacture an integrated circuit comprising a processor core configured to execute instructions; a first data store configured to store a first hardware security identifier; a marker circuitry configured to tag memory requests transmitted on a bus of the integrated circuit by the processor core with the first hardware security identifier; a checker circuitry configured to check memory requests for one or more memory mapped resources that are received via the bus that have been tagged with a hardware security identifier to determine whether to allow or reject access based on the tagged hardware security identifier; and a second data store configured to store an address field, an address range configuration field that indicates whether the address field specifies an upper bound of an address range for a resource or the address field specifies a lower bound and a size of the address range for the resource, and a hardware security list for the resource that specifies which hardware security identifiers supported by the integrated circuit are authorized for access to the resource, wherein the checker circuitry is configured to determine the address range for the resource based on the address field and the address range configuration field and compare the tagged hardware security identifier of a memory request to the hardware security list when an address of the memory request is within the address range for the resource.

In a fourth aspect, the subject matter described in this specification can be embodied in an integrated circuit including circuitry that adaptively determine a memory range for a memory mapped resource based on configuration information stored using a selectable format for describing the memory range; identify one or more permitted memory protection identifiers associated with the memory mapped resource; and determine whether to allow or reject a memory request for the memory mapped resource, the memory request tagged with a request memory protection identifier, the determination based on whether the request memory protection identifier matches at least one of the permitted memory protection identifiers In a fifth aspect, the subject matter described in this specification can be embodied in methods that include adaptively determining a memory range for a memory mapped resource based on configuration information stored using a selectable format for describing the memory range; identifying one or more permitted memory protection identifiers associated with the memory mapped resource; and determining whether to allow or reject a memory request for the memory mapped resource, the memory request tagged with a request memory protection identifier, the determining based on identifying whether the request memory protection identifier matches at least one of the permitted memory protection identifiers. In the fourth aspect, the selectable format may include an address field; and an address range configuration field that indicates whether the address field specifies an upper bound of an address range for a resource or the address field specifies a lower bound and a size of the address range for the resource.

In a sixth aspect, the subject matter described in this specification can be embodied in a non-transitory computer readable medium comprising a circuit representation that, when processed by a computer, is used to program or manufacture an integrated circuit comprising circuitry that adaptively determine a memory range for a memory mapped resource based on configuration information stored using a selectable format for describing the memory range; identify one or more permitted memory protection identifiers associated with the memory mapped resource; and determine whether to allow or reject a memory request for the memory mapped resource, the memory request tagged with a request memory protection identifier, the determination based on whether the request memory protection identifier matches at least one of the permitted memory protection identifiers.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:
   a processor core configured to execute instructions;
   a first data store configured to store a first hardware security identifier;
   a marker circuitry configured to tag memory requests transmitted on a bus of the integrated circuit by the processor core with the first hardware security identifier;
   a checker circuitry configured to check memory requests for one or more memory mapped resources that are received via the bus that have been tagged with a hardware security identifier to determine whether to allow or reject access based on the tagged hardware security identifier; and
   a second data store configured to store an address field, an address range configuration field that indicates whether the address field specifies an upper bound of an address range for a resource or the address field specifies a lower bound and a size of the address range for the resource, and a hardware security list for the resource that specifies which hardware security identifiers supported by the integrated circuit are authorized for access to the resource, wherein the checker circuitry is configured to determine the address range for the resource based on the address field and the address range configuration field and compare the tagged hardware security identifier of a memory request to the hardware security list when an address of the memory request is within the address range for the resource.

2. The integrated circuit of claim 1, in which the resource is a first resource, the address field is a first address field, the address range configuration field is a first address range configuration field, the hardware security list is a first hardware security list, the address range for the first resource is a first address range, and comprising:
   a third data store configured to store a second address field, a second address range configuration field that indicates whether the address field specifies an upper bound of a second address range for a second resource or the second address field specifies a lower bound and a size of the second address range for the second resource, and a second hardware security list for the second resource that specifies which hardware security identifiers supported by the integrated circuit are authorized for access to the second resource, wherein the checker circuitry is configured to, when the first address range configuration field indicates that the first address field specifies an upper bound of the first address range, determine the first address range based on the upper bound specified by the first address field and based on a lower bound determined based on the second address field and the second address range configuration field.

3. The integrated circuit of claim 2, in which, when the second address range configuration field indicates that the second address field specifies a lower bound and a size of the second address range, the checker circuitry is configured to determine the lower bound of the first address range as equal to an upper bound of the second address range that is determined based on the lower bound and the size specified by the second address field.

4. The integrated circuit of claim 1, in which the size of the address range is constrained to be a power of two.

5. The integrated circuit of claim 1, in which the size of the address range is encoded as a string of consecutive ones in the least significant bits of the address field that is terminated by a zero.

6. The integrated circuit of claim 1, in which the address range configuration field also indicates whether access to the resource is enabled.

7. The integrated circuit of claim 1, in which the second data store is one of multiple data stores corresponding to respective resources for which the checker circuitry controls access.

8. The integrated circuit of claim 1, in which access to the second data store is restricted to a trusted world processor core.

9. The integrated circuit of claim 1, in which the checker circuitry is configured to:
responsive to the rejection of the memory request for the resource, source an interrupt signal; and
responsive to the rejection of the memory request for the resource, send a denied message via the bus in response to the memory request.

10. The integrated circuit of claim 1, in which the second data store is part of the checker circuitry.

11. A method comprising:
receiving, via a bus from a processor core, a memory request for a memory mapped resource, wherein the memory request is tagged with a first hardware security identifier;
comparing an address included in the memory request to an address range for a resource, wherein the address range is determined based on an address field and an address range configuration field;
comparing the first hardware security identifier from the memory request to a hardware security list associated with the resource when the address of the memory request is within the address range for the resource, wherein the hardware security list specifies which hardware security identifiers supported by an integrated circuit are authorized for access to the resource; and
based on the comparison of the first hardware security identifier with the hardware security list, determining whether to allow or reject access to the resource for the memory request.

12. The method of claim 11, in which the resource is a first resource, the address field is a first address field, the address range configuration field is a first address range configuration field, the hardware security list is a first hardware security list, the address range for the first resource is a first address range, and comprising:
when the first address range configuration field indicates that the first address field specifies an upper bound of the first address range, determining the first address range based on the upper bound specified by the first address field and based on a lower bound determined based on a second address field and a second address range configuration field, wherein the second address range configuration field indicates whether the second address field specifies an upper bound of a second address range for a second resource or the second address field specifies a lower bound and a size of the second address range for the second resource.

13. The method of claim 12, comprising:
when the second address range configuration field indicates that the second address field specifies a lower bound and a size of the second address range, determining the lower bound of the first address range as equal to an upper bound of the second address range that is determined based on the lower bound and the size specified by the second address field.

14. The method of claim 11, in which a size of the address range is constrained to be a power of two.

15. The method of claim 11, in which a size of the address range is encoded as a string of consecutive ones in the least significant bits of the address field that is terminated by a zero.

16. The method of claim 11, in which the address range configuration field also indicates whether access to the resource is enabled.

17. The method of claim 11, comprising:
responsive to the rejection of the memory request for the resource, sourcing an interrupt signal; and
responsive to the rejection of the memory request for the resource, sending a denied message via the bus in response to the memory request.

18. The method of claim 17, in which a trusted world processor core is configured to receive the interrupt signal.

19. A non-transitory computer readable medium comprising a circuit representation that, when processed by a computer, is used to program or manufacture an integrated circuit comprising:
a processor core configured to execute instructions;
a first data store configured to store a first hardware security identifier;
a marker circuitry configured to tag memory requests transmitted on a bus of the integrated circuit by the processor core with the first hardware security identifier;
a checker circuitry configured to check memory requests for one or more memory mapped resources that are received via the bus that have been tagged with a hardware security identifier to determine whether to allow or reject access based on the tagged hardware security identifier; and
a second data store configured to store an address field, an address range configuration field that indicates whether the address field specifies an upper bound of an address range for a resource or the address field specifies a lower bound and a size of the address range for the resource, and a hardware security list for the resource that specifies which hardware security identifiers supported by the integrated circuit are authorized for access to the resource, wherein the checker circuitry is configured to determine the address range for the resource based on the address field and the address range configuration field and compare the tagged hardware security identifier of a memory request to the hardware security list when an address of the memory request is within the address range for the resource.

20. The non-transitory computer readable medium of claim 19, in which the resource is a first resource, the address field is a first address field, the address range configuration field is a first address range configuration field, the hardware security list is a first hardware security list, the address range for the first resource is a first address range, and in which the integrated circuit comprises:

a third data store configured to store a second address field, a second address range configuration field that indicates whether the address field specifies an upper bound of a second address range for a second resource or the second address field specifies a lower bound and a size of the second address range for the second resource, and a second hardware security list for the second resource that specifies which hardware security identifiers supported by the integrated circuit are authorized for access to the second resource, wherein the checker circuitry is configured to, when the first address range configuration field indicates that the first address field specifies an upper bound of the first address range, determine the first address range based on the upper bound specified by the first address field and based on a lower bound determined based on the second address field and the second address range configuration field.

* * * * *